US011330356B2

(12) United States Patent
Saule et al.

(10) Patent No.: US 11,330,356 B2
(45) Date of Patent: May 10, 2022

(54) HEADPHONES AND HEADPHONE SYSTEMS

(71) Applicant: Dolby Laboratories Licensing Corporation, San Francisco, CA (US)

(72) Inventors: Lucas E. Saule, San Francisco, CA (US); Gareth James Selfe, San Francisco, CA (US); Richard Louis Weisman, Pasadena, CA (US); Daniel Corey Wiggins, Port Nueneme, CA (US); Louis D. Fielder, Millbrae, CA (US); Peter Michaelian, San Francisco, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 17/073,045

(22) Filed: Oct. 16, 2020

(65) Prior Publication Data
US 2021/0037309 A1 Feb. 4, 2021

Related U.S. Application Data

(62) Division of application No. 16/309,294, filed as application No. PCT/US2017/038567 on Jun. 21, 2017, now Pat. No. 10,880,633.
(Continued)

(51) Int. Cl.
*H04R 5/02* (2006.01)
*H04R 1/10* (2006.01)
(Continued)

(52) U.S. Cl.
CPC ......... *H04R 1/1066* (2013.01); *H04R 1/1008* (2013.01); *H04R 1/1025* (2013.01);
(Continued)

(58) Field of Classification Search
CPC .... H04R 1/1066; H04R 19/02; H04R 1/1025; H04R 1/1008
See application file for complete search history.

(56) References Cited

U.S. PATENT DOCUMENTS

| 3,645,354 A | 2/1972 | Kliewer |
| 4,278,852 A | 7/1981 | Goerike |
| (Continued) | | |

FOREIGN PATENT DOCUMENTS

| CN | 201479342 | 5/2010 |
| CN | 203933895 | 11/2014 |
| (Continued) | | |

OTHER PUBLICATIONS

Davidson, G. et al. "Design and Subjective Evaluation of a Perceptually-Optimized Headphone Virtualizer" AES presented at the 140th Convention, Jun. 4-7, 2016, Paris, France, pp. 1-10.
(Continued)

*Primary Examiner* — Amir H Etesam

(57) ABSTRACT

Some headphone systems include two ear cups, a headband assembly, an interface system and a control system. Each ear cup may include an ear cup enclosure, an ear pad assembly, a speaker system and a hinge assembly. The hinge assembly may be disposed within the ear cup enclosure such that it is not visible from outside the ear cup. The headband assembly may connect with each of the ear cups via the hinge assembly. The interface system may include at least one interface and a plurality of input source buttons disposed on at least one of the ear cups. Each of the input source buttons may be configured for selecting a source of audio data received via the at least one interface. The control system may be configured for controlling the speaker system to reproduce audio data received via the interface and selected by one of the input source buttons.

23 Claims, 20 Drawing Sheets

Related U.S. Application Data

(60) Provisional application No. 62/438,337, filed on Dec. 22, 2016, provisional application No. 62/367,584, filed on Jul. 27, 2016, provisional application No. 62/353,412, filed on Jun. 22, 2016.

(51) Int. Cl.
  *H04R 19/02* (2006.01)
  *H01R 13/62* (2006.01)
  *H01R 13/64* (2006.01)

(52) U.S. Cl.
  CPC ......... *H04R 19/02* (2013.01); *H01R 13/6205* (2013.01); *H01R 13/64* (2013.01); *H02J 2207/40* (2020.01); *H04R 2201/10* (2013.01)

(56) References Cited

U.S. PATENT DOCUMENTS

| | | | |
|---|---|---|---|
| 4,674,134 A | 6/1987 | Lundin | |
| 4,922,542 A | 5/1990 | Sapiejewski | |
| 4,989,271 A | 2/1991 | Sapiejewski | |
| 5,267,321 A | 11/1993 | Langberg | |
| 6,856,690 B1 | 2/2005 | Skulley | |
| 7,130,437 B2 | 10/2006 | Stonikas | |
| 7,245,736 B2 | 7/2007 | Tsunoda | |
| 7,286,675 B1 | 10/2007 | O'Neill | |
| 7,483,545 B2 | 1/2009 | Nagaoka | |
| 7,940,946 B2 | 5/2011 | Caldarola | |
| 8,098,872 B2 | 1/2012 | Chang | |
| D684,140 S | 6/2013 | Enquist | |
| 8,582,796 B2 | 11/2013 | Kimura | |
| 8,594,351 B2 | 11/2013 | Harlow | |
| D707,653 S | 6/2014 | Hardi | |
| D719,135 S | 12/2014 | Kelley | |
| D722,998 S | 2/2015 | Sancho | |
| D724,559 S | 3/2015 | Reaux | |
| D725,628 S | 3/2015 | Tompkin | |
| D725,630 S | 3/2015 | Nakagawa | |
| D726,146 S | 4/2015 | Binder | |
| D727,283 S | 4/2015 | Dryden | |
| 9,084,066 B2 | 7/2015 | De Vries | |
| 9,087,506 B1 | 7/2015 | Kraft | |
| D736,174 S | 8/2015 | Levine | |
| D736,175 S | 8/2015 | Levine | |
| 9,208,769 B2 | 12/2015 | Azmi | |
| 9,226,082 B2 | 12/2015 | Friis | |
| 9,232,308 B2 | 1/2016 | Murata | |
| 9,247,342 B2 | 1/2016 | Croft, III | |
| 2010/0284558 A1 | 11/2010 | Kimura | |
| 2011/0069852 A1 | 3/2011 | Arndt | |
| 2012/0051576 A1 | 3/2012 | Shiomi | |
| 2012/0076341 A1 | 3/2012 | Ozawa | |
| 2012/0207320 A1 | 8/2012 | Avital | |
| 2013/0315411 A1 | 11/2013 | Annunziato | |
| 2013/0322676 A1* | 12/2013 | Araki | H04R 1/1041 381/374 |
| 2013/0322677 A1 | 12/2013 | Jensen | |
| 2014/0233754 A1 | 8/2014 | Chae | |
| 2014/0334657 A1 | 11/2014 | Guenther | |
| 2015/0319539 A1 | 11/2015 | Wei | |
| 2015/0350765 A1 | 12/2015 | David | |
| 2016/0007112 A1 | 1/2016 | Broadley | |
| 2016/0057524 A1 | 2/2016 | Kulavik | |
| 2016/0157027 A1 | 2/2016 | Hug | |
| 2016/0150306 A1 | 5/2016 | Huang | |
| 2016/0219362 A1 | 7/2016 | Litovsky | |

FOREIGN PATENT DOCUMENTS

| | | | |
|---|---|---|---|
| CN | 104581483 | 4/2015 | |
| CN | 205105363 | 3/2016 | |
| EP | 1075164 | 2/2001 | |
| EP | 1596461 | 11/2005 | |
| JP | 3125481 | 9/2006 | |
| JP | 2009284169 | * 5/2008 | ............... H04R 1/10 |
| JP | 2009284169 | 12/2009 | |
| JP | 3178421 | 9/2012 | |
| JP | 2012169825 | 9/2012 | |
| JP | 2013157879 | 8/2013 | |
| WO | 2016032523 | 3/2016 | |

OTHER PUBLICATIONS

Neumann, J.J. et al "CMOS-MEMS Membrane for Audio-Frequency Acoustic Actuation" IEEE Jan. 1, 2001, pp. 175-182.

* cited by examiner

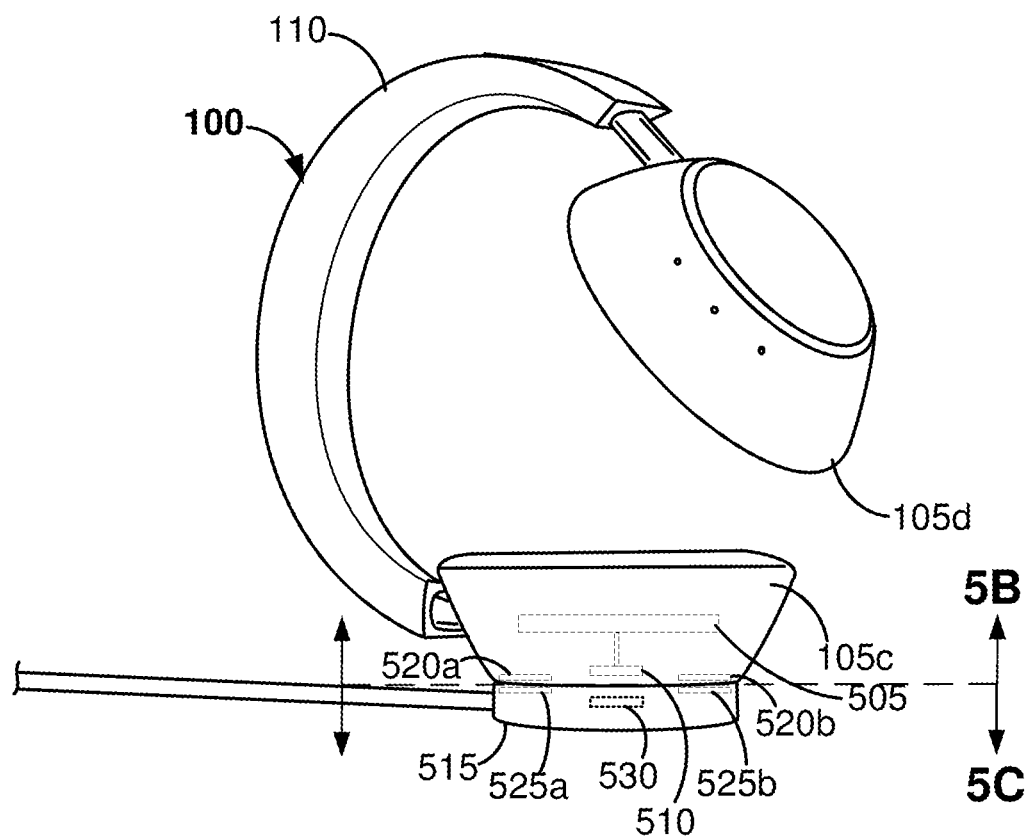
Figure 5A
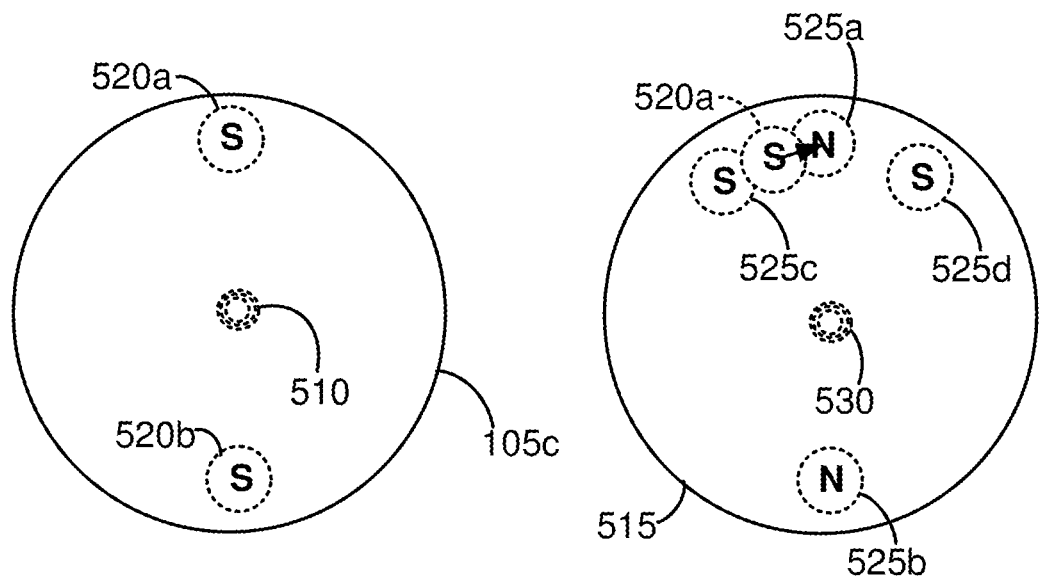
Figure 5B Figure 5C

HEADPHONES AND HEADPHONE SYSTEMS

CROSS-REFERENCE TO RELATED APPLICATIONS

This application claims priority to U.S. Provisional Patent Application No. 62/438,337, which was filed on Dec. 22, 2016, to U.S. Provisional Patent Application No. 62/367,584, which was filed on Jul. 27, 2016, to U.S. Provisional Patent Application No. 62/353,412 filed on Jun. 22, 2016 and to PCT Application No. PCT/US2017/038567, filed on Jun. 21, 2017, each of which is incorporated herein by reference in its entirety and for all purposes. This application claims priority to, and is a divisional of, U.S. patent application Ser. No. 16/309,294, which was filed on Dec. 12, 2018 and which is hereby incorporated by reference in its entirety and for all purposes.

TECHNICAL FIELD

This disclosure relates to devices configured for processing audio data. In particular, this disclosure relates to headphones and related devices.

BACKGROUND

The use of audio devices such as headphones and earbuds has become extremely common. Some headphones can at least partially occlude sounds from the outside world. Some headphones are capable of creating a substantially closed system between headphone speakers and the eardrum, in which sounds from the outside world are greatly attenuated. Some headphones are substantially sealed, whereas other headphones include one or more vents between air volumes inside the ear cups and the outside atmosphere. There are various potential advantages of attenuating sounds from the outside world via headphones or other such audio devices, such as eliminating distortion, providing a flat equalization, etc.

SUMMARY

Some aspects of this disclosure may be implemented in a headphone system. According to some examples, the headphone system may include two ear cups, a headband assembly, an interface system and a control system. In some examples, each ear cup may include an ear cup enclosure, an ear pad assembly, a speaker system including at least one speaker, and a hinge assembly. In some implementations, the hinge assembly may be disposed within the ear cup enclosure such that the hinge assembly is not visible from the exterior of the ear cup. In some examples, the headband assembly may be configured for connecting with each of the ear cups, via the hinge assembly.

In some implementations, the interface system may include at least one interface (such as a wireless or wired interface) and a plurality of input source buttons disposed on at least one of the ear cups. Each of the input source buttons may be configured for selecting a corresponding source of audio data received via the at least one interface.

The control system may include at least one processor, such as a general purpose single- or multi-chip processor, a digital signal processor (DSP), an application specific integrated circuit (ASIC), a field programmable gate array (FPGA) or other programmable logic device, discrete gate or transistor logic, discrete hardware components, and/or combinations thereof. According to some implementations, the control system may be configured for controlling the speaker system of each ear cup to reproduce the audio data received via the interface and selected by one of the input source buttons.

In some examples, the hinge assembly of each ear cup may be configured to pivot the ear cup around two axes. According to some implementations, the hinge assembly of each ear cup may be configured to return the ear cup to a rest position after the ear cup has been displaced from the rest position.

According to some implementations, the headphone system may include a battery, an electrical input mechanism disposed in an ear cup and at least two ear cup magnets disposed in the ear cup. The electrical input mechanism may be configured for receiving power from a battery charger. The at least two ear cup magnets may be configured to position the electrical input mechanism for receiving power from the battery charger when the ear cup magnets are positioned proximate corresponding battery charger magnets of the battery charger.

According to some examples, the headphone system may include the battery charger. In some implementations, the battery charger may include an electrical output mechanism configured for providing power to the electrical input mechanism and at least four battery charger magnets. For example, two of the battery charger magnets may have the same polarity as the ear cup magnets and two of the battery charger magnets may have a polarity that is opposite from the polarity of the ear cup magnets. According to some such implementations, the battery charger magnets having a polarity that is opposite from the polarity of the ear cup magnets may be configured to align with the ear cup magnets. In some such examples, the battery charger magnets having the same polarity as the ear cup magnets may reside proximate to, and on opposing sides of, one of the battery charger magnets having a polarity that is opposite from the polarity of the ear cup magnets.

In some examples, the hinge assembly may be configured to maintain an alignment of the ear cups when the ear cup magnets are positioned proximate the corresponding battery charger magnets of the battery charger. According to some implementations, the hinge assembly may include a swivel pivot assembly configured for attachment with the headband assembly. According to some such implementations, the swivel pivot assembly may be configured to allow an ear cup to swivel within a swivel angle range. According to some examples, the swivel pivot assembly may include a spring. In some examples, the hinge assembly may include an arm and a camber pivot assembly. The camber pivot assembly may be configured to allow an ear cup to swivel within a camber angle range. A first portion of the arm may be attached to the camber pivot assembly and a second portion of the arm may be attached to the swivel pivot assembly.

According to some implementations, each ear cup may include a rear air volume between a first side of the speaker system and the ear cup enclosure, and a front air volume proximate a second side of the speaker system and proximate the ear pad assembly. In some examples, each ear cup may include at least one vent disposed between an exterior of the ear cup and either the front air volume or the rear air volume. The at least one vent may include an acoustic low-pass filter. In some implementations, the at least one vent may include a first vent between the exterior of the ear cup and the front air volume, and a second vent between the exterior of the ear cup and the rear air volume. According to some examples, the first vent and the second vent each include an acoustic low-pass filter. In some examples, the acoustic low-pass filter may include at least one expansion chamber. According to some implementations, the rear air volume may be between 1 and 20 cubic centimeters. In some implementations, the acoustic low-pass filter may be configured to attenuate higher-frequency sounds produced by air flowing through the at least one vent.

According to some examples, the ear cup enclosure may include a single piece of flexible material that encloses the ear cup. However, in some implementations the ear cup enclosure may include a first portion of flexible material that encloses a support structure and overmold foam disposed on the support structure. According to some such implementations, a second portion of flexible material may enclose ear pad foam of the ear pad assembly. In some examples, the ear pad assembly may include an ear pad support structure proximate the ear pad foam. According to some examples, the ear pad support structure may define, at least in part, an angle between the ear pad assembly and the ear cup enclosure. Some implementations may include an adhesive layer and/or a fastener for joining the first portion and the second portion.

In some implementations, both the ear pad foam and the overmold foam may be compressed when the ear cups are worn. According to some implementations, at least a portion of each ear pad assembly may be within a corresponding ear cup enclosure when the ear cups are worn.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIG. 5A shows an example of headphones connected to a battery charger.

FIG. 5B shows example arrangements of ear cup magnets and an electrical input mechanism.

FIG. 5C shows example arrangements of battery charger magnets and an electrical output mechanism.

Like reference numbers and designations in the various drawings indicate like elements.

DESCRIPTION OF EXAMPLE EMBODIMENTS

The following description is directed to certain implementations for the purposes of describing some innovative aspects of this disclosure, as well as examples of contexts in which these innovative aspects may be implemented. However, the teachings herein can be applied in various different ways. For example, while various implementations are described in terms of particular audio devices, the teachings herein are widely applicable to other known audio devices, as well as audio devices that may be introduced in the future. Moreover, the described implementations may be implemented, at least in part, in various devices and systems as hardware, software, firmware, cloud-based systems, etc. Accordingly, the teachings of this disclosure are not intended to be limited to the implementations shown in the figures and/or described herein, but instead have wide applicability.

Figure 1:
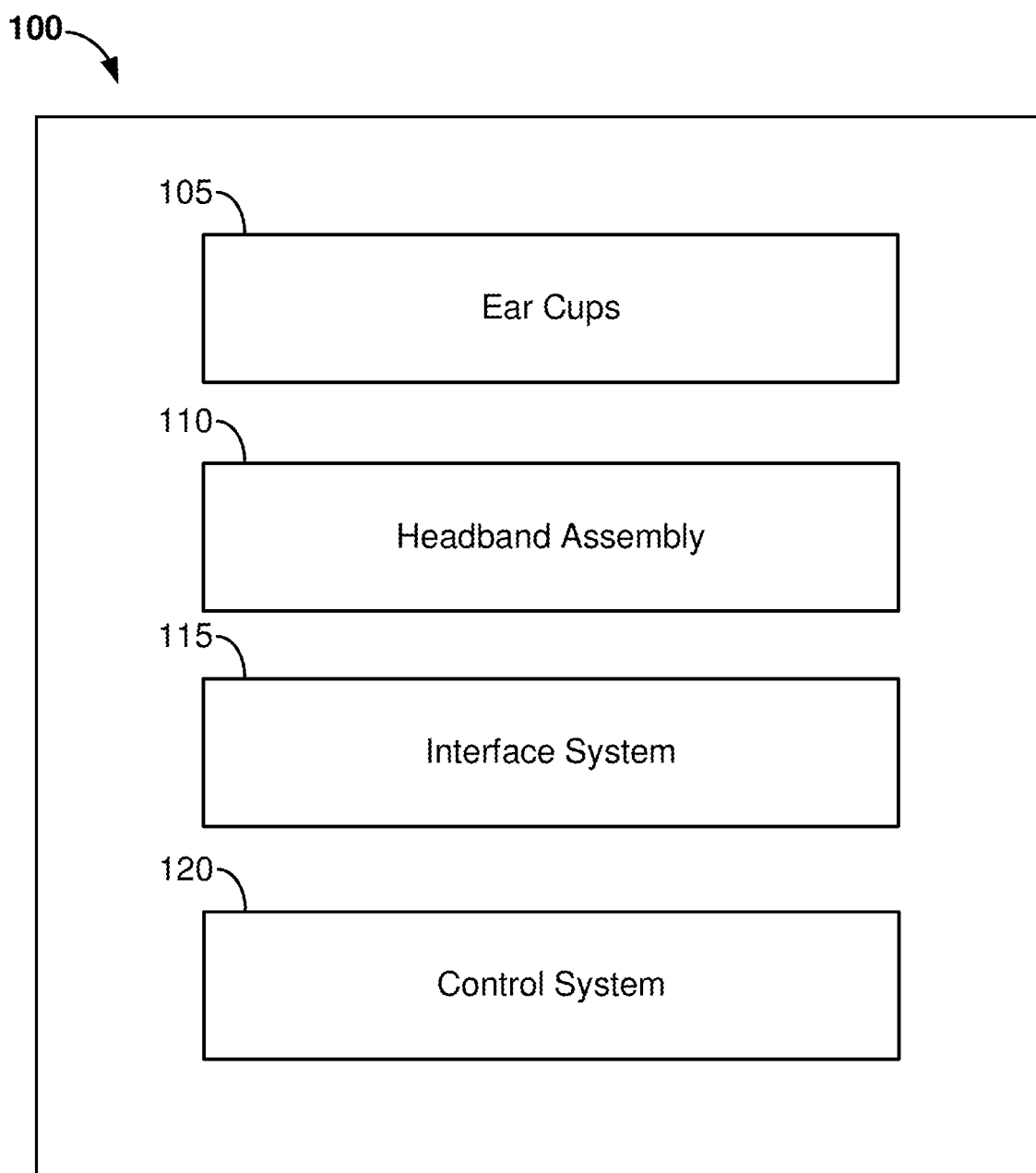
FIG. 1 is a block diagram that shows examples of components of an apparatus capable of implementing various aspects of this disclosure.

FIG. 1 is a block diagram that shows examples of components of an apparatus capable of implementing various aspects of this disclosure. In this example, the headphone system 100 includes two ear cups 105, a headband assembly 110, an interface system 115 and a control system 120.

In some examples, each of the ear cups 105 includes an ear cup enclosure, an ear pad assembly, a hinge assembly and a speaker system that includes at least one speaker. According to some implementations, the hinge assembly is disposed within the ear cup enclosure such that the hinge assembly is not visible from the exterior of the ear cup.

In this example, the headband assembly 110 is configured for connecting with each of the ear cups. According to some examples, the hinge assembly 110 is configured for connecting with each of the ear cups via the hinge assembly.

The interface system 115 includes at least one interface, such as one or more wired and/or wireless interfaces, ports, etc. In this example, the interface system 115 is configured for receiving audio data. According to some implementations, the interface system 115 includes at least one user interface. In some examples, the interface system 115 includes a plurality of input source buttons disposed on at least one of the ear cups. According to some implementations, each of the input source buttons is configured for selecting a corresponding source of audio data received via at least one interface of the interface system 115. In some implementations, the apparatus may include a memory system. The interface system 115 may include at least one interface between the control system and the memory system.

The control system 120 may include at least one processor, such as a general purpose single- or multi-chip processor, a digital signal processor (DSP), an application specific integrated circuit (ASIC), a field programmable gate array (FPGA) or other programmable logic device, discrete gate or transistor logic, discrete hardware components, and/or combinations thereof. In this example, the control system 120 is configured for controlling the speaker system of each ear cup 105 to reproduce audio data received via an interface of the interface system 115 and selected by one of the input source buttons of the interface system 115.

Some or all of the methods described herein may be performed by one or more devices according to instructions (e.g., software) stored on non-transitory media. Such non-transitory media may include memory devices such as those described herein, including but not limited to random access memory (RAM) devices, read-only memory (ROM) devices, etc. The non-transitory media may, for example, reside in the control system 120 or in a memory system that is configured for communication with the control system 120. Accordingly, various innovative aspects of the subject matter described in this disclosure can be implemented in a non-transitory medium having software stored thereon. The software may, for example, include instructions for controlling at least one device to process audio data. The software may, for example, be executable by one or more components of the control system 120.

Figure 2A:
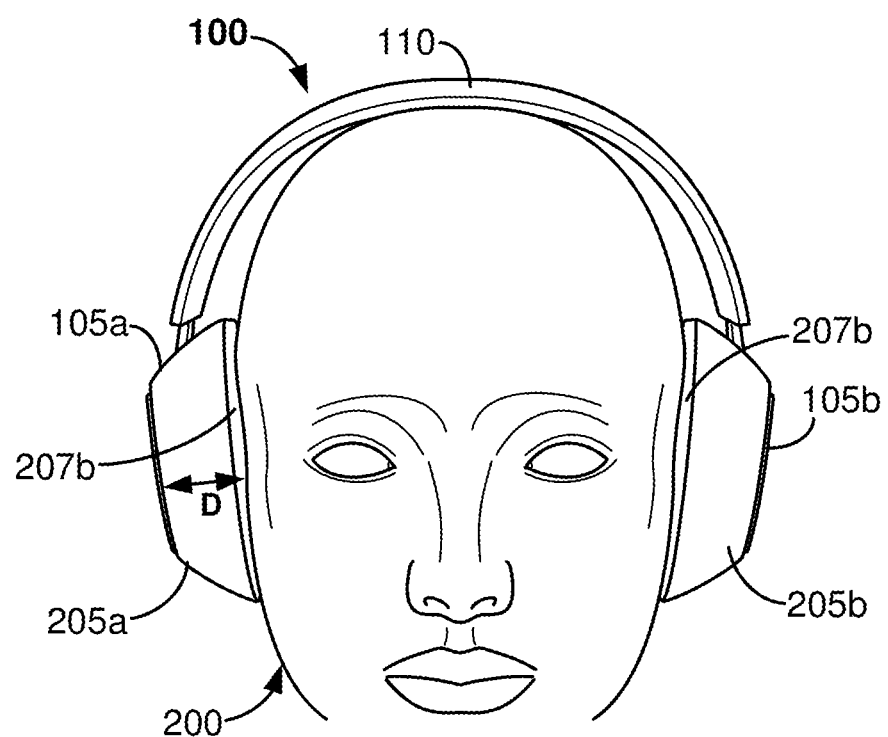
FIGS. 2A and 2B show front and side views, respectively, of one headphone implementation.
Figure 2B:
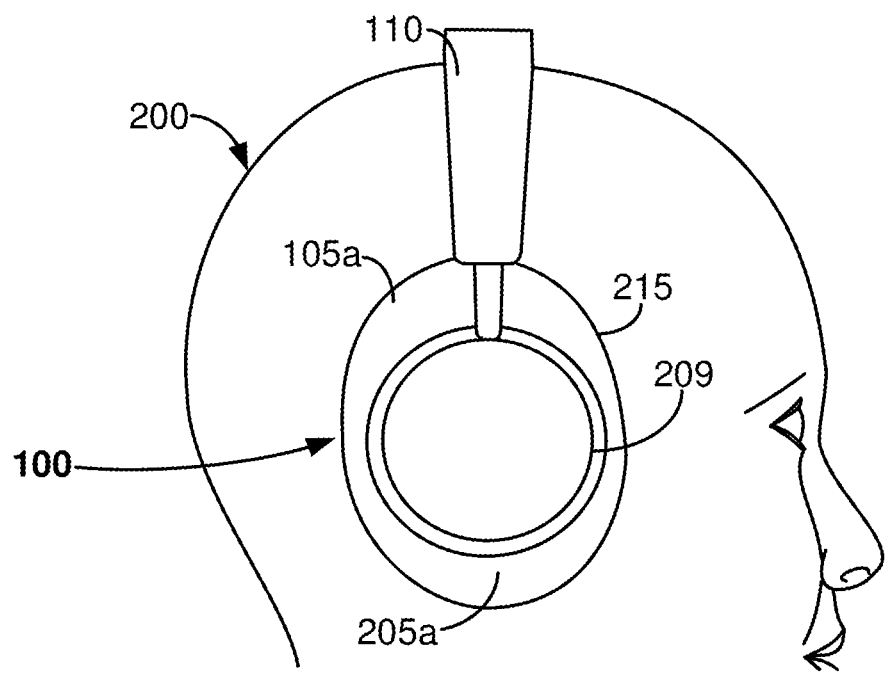

FIGS. 2A and 2B show front and side views, respectively, of one headphone implementation. FIG. 2A shows examples of both the ear cup 105*a* and the ear cup 105*b*. The headband assembly 110, which is shown extending over the user's head 200, connects the ear cup 105*a* with the ear cup 105*b*. FIG. 2A shows examples of front portions of the ear cup enclosures 205*a* and 205*b*.

Portions of ear pad assembly 207*a* and the ear pad assembly 207*b* may be seen in FIG. 2A. Additional portions of ear pad assembly 207*a* and the ear pad assembly 207*b* are within the ear cup enclosures 205*a* and 205*b*. Instead of ballooning out conspicuously, in this example the ear pad assembly 207*a* and the ear pad assembly 207*b* are partially hidden from view. Some such implementations can allow the ear cup 105*a* and the ear cup 105*b* to maintain a relatively smaller depth D. Instead of being defined by large, exposed ear pads, the shapes of the ear cup 105*a* and the ear cup 105*b* are principally defined by the tapered profile of the ear cup enclosures 205*a* and 205*b*.

In the example shown in FIG. 2B, the outer edge 215 of the ear cup 105*a* has an oval shape, whereas the central portion 209 has a circular shape. In this example, the headband assembly 110 is configured for connecting with the ear cups 105*a* and 105*b* via a hinge assembly. However, in this example, the hinge assembly is disposed within the ear cup enclosure 205*a* such that the hinge assembly is not visible from the exterior of the ear cup 105*a*. Some examples of the hinge assembly are described below with reference to FIG. 7.

Figure 2C:
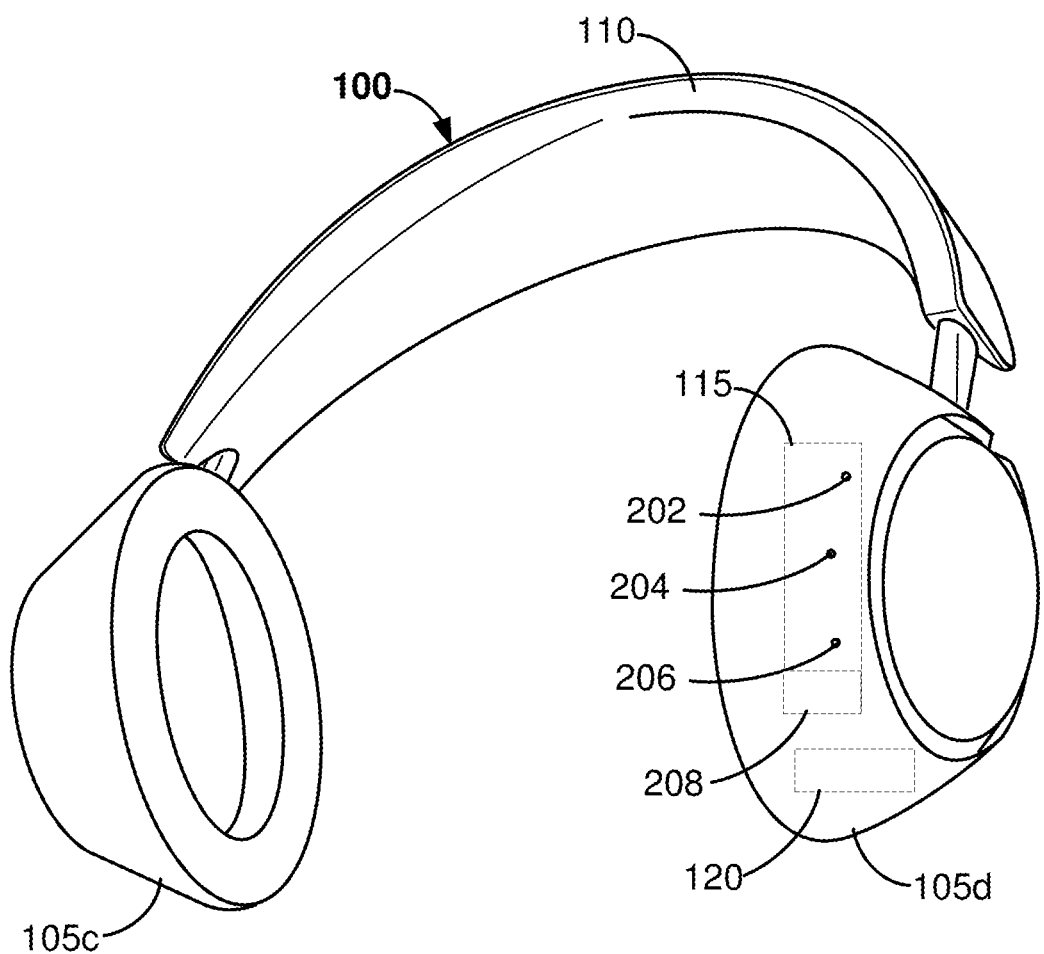
FIG. 2C shows an oblique view of one headphone implementation.

FIG. 2C shows an oblique view of one headphone implementation. In this example, an interface system 115 of the headphones 100 includes input source buttons 202, 204 and 206 disposed on the ear cup 105*d*. The number, size and distribution of input source buttons shown in FIG. 2C are merely made by way of example. In some alternative examples, more or fewer input source buttons may be disposed on the ear cup 105*d*. In some alternative examples, input source buttons may be disposed on the ear cup 105*e* and/or on the headband assembly 110.

According to some implementations, each of the input source buttons 202-206 is configured for selecting a corresponding source of audio data received via at least one interface of the interface system 115. In this example, the interface system 115 includes a wireless transceiver 208. In some implementations, the interface system 115 may include additional and/or alternative interfaces, such as a port configured as a wired interface (such as a port configured to make an electrical connection with a headphone jack). According to this implementation, each of the input source buttons 202-206 is configured for selecting a corresponding source of audio data received via the wireless transceiver 208. In this example, the control system 120 is configured for controlling a speaker system of the ear cups 105*c* and 105*d* to reproduce the audio data received via the wireless transceiver 208 and selected by one of the input source buttons 202-206.

Some wireless communications protocols operate by designating devices as either a master device or a slave device. Thus, in any pair of communicating devices, one device is the master and the other device is the slave. For example, in the Bluetooth® wireless technology standard maintained by the Bluetooth Special Interest Group of Kirkland, Wash., a master device can establish connections with up to seven slave devices simultaneously. However, a slave device can only connect to one master device at a time.

A master device and its connected slave devices is referred to as a piconet. It is possible for multiple piconets to be linked together, which is referred to as a scatternet.

Establishing a Bluetooth connection starts in an inquiry phase, in which a device transmits an inquiry request. Devices that listen for inquiries are referred to as being in a discoverable state. All devices that receive the inquiry respond with their address.

A device can become a master device during a paging phase. During the paging phase, two devices synchronize their clocks. One device sends a sequence of paging messages and listens for a response from another device. A device that is listening for paging messages is referred to as being in a connectable state. If another device responds, the first device becomes the master device of the connection and the responding device becomes the slave.

After synchronizing during the paging phase, the devices establish an Asynchronous Connection-Less (ACL) connection, which is a low-level communications protocol that carries all data of higher levels of the Bluetooth network protocol stack.

After establishing the ACL connection, the devices open a Logical Link Control and Adaption (L2CAP) channel. The devices can use the L2CAP channel to perform service discovery in order to perform pairing and to discover supported profiles and features of the master device.

Upon first establishing a connection, two devices may undergo a pairing process. During the pairing process, the sink device sends a pairing request to the master device. The sink device then prompts a user to enter a personal identification number (PIN) at the master device to complete the pairing process.

Once pairing has been completed, the sink device can store the address of the master device in a list of trusted devices that have successfully been paired with the sink device. The list of trusted devices thus maintains an address for each paired master device as well as an associated index for each paired master device. The sink device can then skip the pairing process for any master device that occurs in the list of trusted devices.

The Bluetooth standard defines a number of application profiles that specify services that are offered by a Bluetooth-enabled device. A single device can support multiple profiles. Common profiles include an Advanced Audio Distribution Profile (A2DP), which defines how audio data can be streamed from one device to another; an Audio Video Remote Control Profile (AVRCP), which provides an interface for controlling televisions and other audio/video equipment; and a Hands Free Profile (HFP), which is used to communicate with hands-free sink devices. The devices can open one or more L2CAP channels to support one or more of the supported profiles.

Particular embodiments of the subject matter described in this specification can be implemented so as to realize one or more of the following potential advantages. A sink device can implement intent-based switching that honors the intent of the user in determining which audio source from which to receive audio data. A user can easily and quickly switch between multiple audio source devices with very little user input. After requesting a switch, the user need not provide any additional input to the sink device or any of the source devices to begin receiving audio data at the sink device. A sink device can switch between multiple different activities of a single audio source device. According to some examples, a sink device does not switch to other sources when a connected source device becomes unavailable.

This specification describes an audio sink device with user intent-based switching capability. This means that a user can cause the audio sink device to switch between multiple wirelessly connected source devices using user input, which can be one or more dedicated user interface controls. A "sink device" is an audio output device that is configured to wirelessly receive audio data from a source device using a wireless communications protocol. Common sink devices include wireless headphone sets and standalone wireless speakers.

In this specification, a dedicated user interface control means a user input mechanism that maps user input to a particular source device. For example, a dedicated user interface control can be a physical button, toggle, dial, or switch. The dedicated user interface control can also be a soft user interface control that corresponds to a particular activated area of a presence-sensitive surface or display.

Figure 2D:
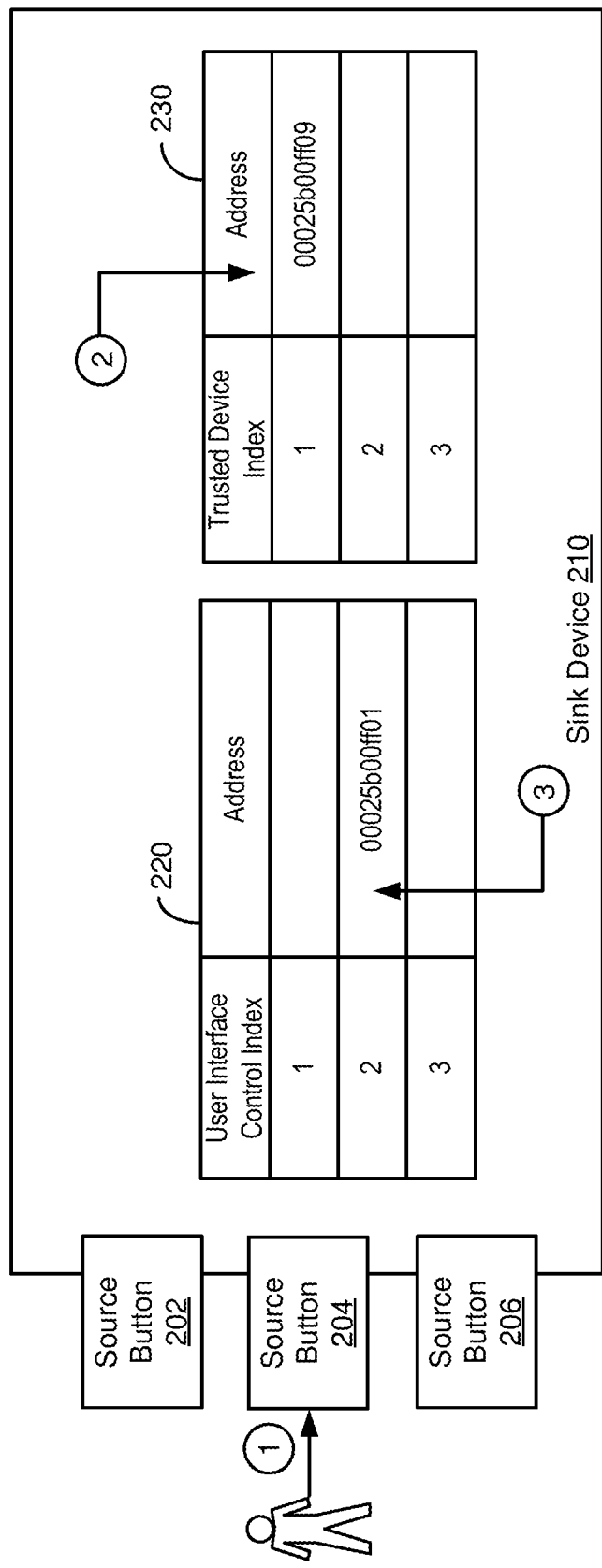
FIG. 2D illustrates components of an example sink device.

FIG. 2D illustrates components of an example sink device 210. The sink device 210 has three dedicated user interface controls: a first source button 202, a second source button 204, and a third source button 206.

The sink device 210 has a switching device table 220 that associates user interface control indexes with addresses of corresponding source devices. The sink device 210 also has a trusted device table 230 that associates trusted device indexes with addresses of corresponding source devices.

A user can associate one of the dedicated user interface controls during a pairing process. The sink device 210 can be configured to distinguish user input that requests pairing with a new audio source device and user input that requests switching to a particular audio source device. For example, the sink device 210 can interpret a short press of a button, e.g., less than 1 second, as a request to switch to an audio source device associated with the button and can interpret a long press of the same button, e.g., 1 second or more, as a request to pair with a new audio source device to be associated with the button.

Thus, during state 1, a user can provide a long press on the second source button 204. The sink device 210 interprets this user input as a request to associate the second source button 204 with a new audio source device.

The sink device 210 then pairs with the new audio source device. This process is described in more detail below with reference to FIG. 3.

After pairing, the sink device 210 considers the paired audio source device to be a trusted device. During state 2, the sink device 210 stores the address of the new audio source device in the trusted device table 230. During state 3, the sink device 210 stores the address of the new audio source device in the switching device table 220, which associates the address of the new audio source device with a user interface control index of the second source button 204.

In some implementations, the sink device can associate each of the dedicated user interface controls with a particular activity on a source device. Thus, a single source device can be associated with multiple user interface controls.

For example, a tablet computer can provide multiple sources of audio information to a sink device that each correspond to a particular activity, e.g., music player audio, cinematic audio, and system notification audio. A user can associate each activity with a user interface control, e.g., one of the source buttons 202, 204, or 206.

For example, a user can associate music player audio with the first source button 202 and cinematic audio with the second source button 204. The user can explicitly select the source button corresponding to desired activity.

To associate a particular activity of a device, the sink device 210 can store an additional column attribute in the switching device table. The additional column attribute corresponds to an activity identifier for a particular activity. Thus, some rows of the switching device table 220 will refer to the same address but different activity identifiers.

This additional information may need to be configured by software running on the source device that provides an activity identifier to the sink device 210. For example, a mobile phone can install an application that enumerates the different activities. Then, during the pairing process, a user can use the application to cause the phone to provide particular activity identifiers to the sink device 210. The sink device 210 then stores the received activity identifiers in the switching device table 220.

Figure 3:
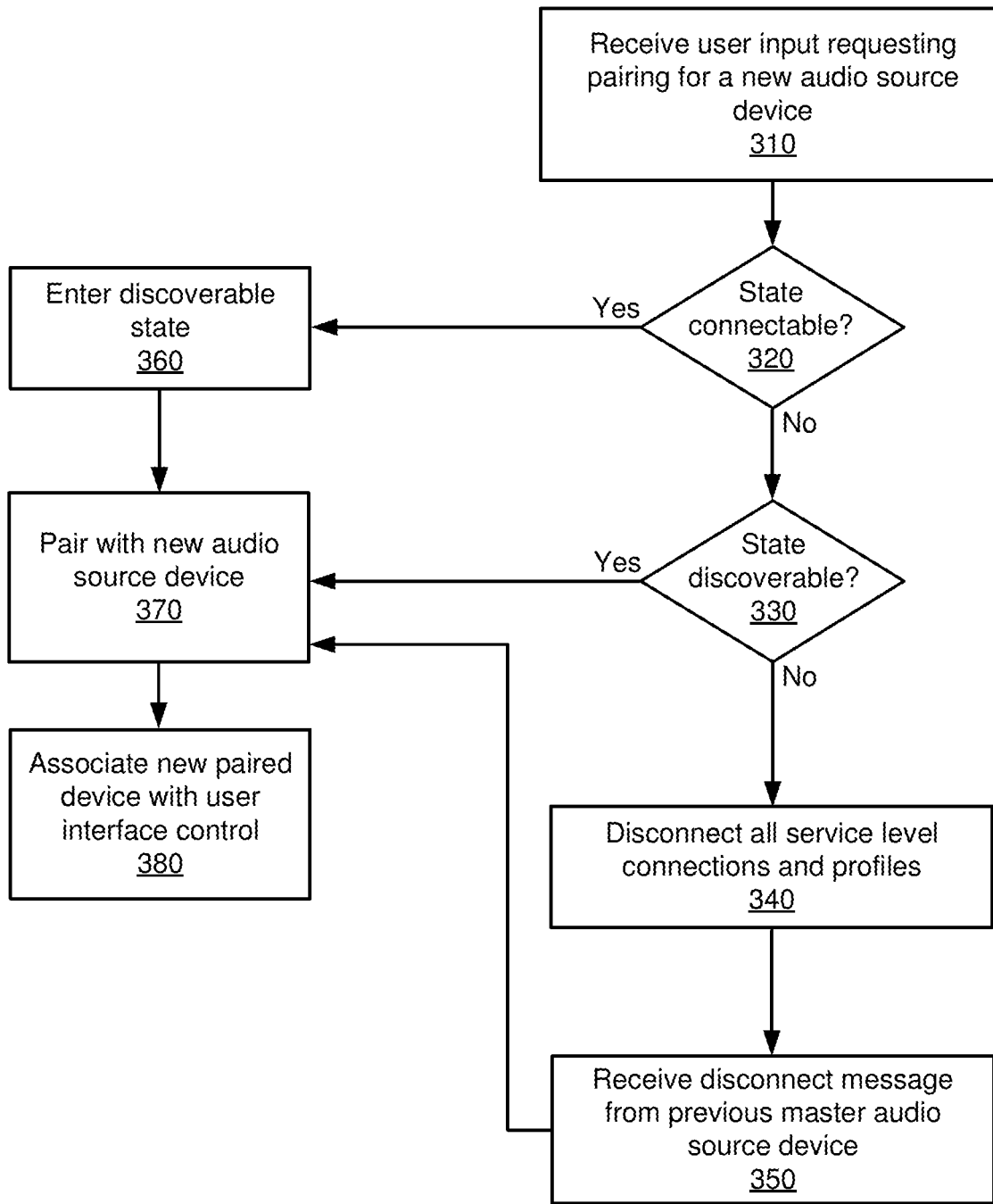
FIG. 3 is a flow chart of an example process for assigning a dedicated user interface control to one of multiple audio source devices.

FIG. 3 is a flow chart of an example process for assigning a dedicated user interface control to one of multiple audio source devices. The process can be performed by an appropriately programmed wireless audio output device comprising one or more computers. For convenience, the process will be described as being performed by an embedded computer or logic circuitry in a sink device. In some examples, the audio output device will perform the example process for each of multiple master audio source devices.

The sink device receives user input requesting pairing for a new audio source device (310). The sink device determines whether its state is connectable (320). A sink device is in a connectable state when it is listening for paging messages from potential master devices trying to establish connections. If the sink device is in a connectable state, the sink device enters a discoverable state (branch to 360).

In the discoverable state, the sink device listens for inquiries from master devices. The connectable state and the discoverable state are not mutually exclusive. Thus, the sink device may already be in the discoverable state. In other words, in step 360 the sink device ensures that it is in the discoverable state in order to discover any new audio source devices that are within range.

The responsiveness of the sink device can be improved by exiting the connectable state so that the sink device is no longer scanning for paging messages. Thus, in some implementations, when entering the discoverable state (360), the sink device exits the connectable state.

After entering the discoverable state (360), the sink device pairs with the new audio source device (370). To pair with the new audio source device, the sink device enters a discoverable state to provide its address to the new audio source device. The sink device then enters a connectable state to synchronize with the new audio source device. In some implementations, the sink device does not require a pairing code in order to pair with the new audio source device.

If the state of the sink device is not connectable (320), the sink device determines whether its state is discoverable (branch to 330). If so, the sink device is ready to pair with new source devices. Thus, the sink device can then pair with the new audio source device (branch to 380).

If the state of the sink device is not discoverable (330), the sink device likely has already has an established connection with a previous master audio source device, and such connection needs to be torn down before pairing with the new audio source device.

Thus, if the state of the sink device is not discoverable (330), the sink device disconnects all service level connections and all profiles (branch to 340). For example, the sink device can disconnect the ACL and L2CAP connections with the previous master audio source device as well as disconnect all A2DP and AVRCP profiles.

When these disconnections occur, the sink device will receive a disconnect message from the previous master audio source device (350). Upon receiving the disconnect message, the sink device can then pair with the new audio source device (370).

After being paired, the sink device associates the new paired device with the selected user interface control (380). For example, the sink device can directly associate the address of the new paired device with a user interface control index corresponding to the selected user interface control. For example, if the sink devices has multiple buttons, each button can be assigned a respective user interface control index. The sink device can associate each user interface control index with the address of a corresponding paired device in a switching device table.

Table 1 illustrates an example switching device table that associates user interface control indexes with addresses.

TABLE 1

| USER INTERFACE CONTROL INDEX | ADDRESS |
| --- | --- |
| 1 | 00025b00ff06 |
| 2 | 00025b00ff01 |
| 3 | 00025b00ff09 |

Thereafter, when the sink device receives user input at a user interface control that requests switching to receiving audio from the new paired device, the sink device can use the switching device table to obtain the address of the new paired device.

However, in some cases, fewer modifications to the wireless protocol stack are required if the sink device also maintains a trusted device table that associates trusted device indexes to addresses. After being paired, the standard libraries of some wireless communication protocols maintain a trusted device table. When using these libraries, the sink device assigns a trusted device index for the new paired device and associates the address of the new paired device with the corresponding trusted device index.

Subsequent interactions with the wireless protocol stack use the trusted device index as input to the application programming interfaces (APIs) of the standard libraries. Thus, instead of using the address of the connected devices to perform various operations, the sink device can use the trusted device index.

Table 2 illustrates an example trusted device table that associates trusted device indexes to addresses:

TABLE 2

| TRUSTED DEVICE INDEX | ADDRESS |
| --- | --- |
| 1 | 00025b00ff09 |
| 2 | 00025b00ff06 |
| 3 | 00025b00ff01 |

The sink device can obtain a trusted device index given a user interface control index by comparing the entries in the tables. The sink device can then optionally store the trusted device table and the switching device table in persistent storage integrated with the sink device. By storing the trusted device table and the switching device table in persistent storage, the device need not undergo pairing processes after a restart.

Figure 4:
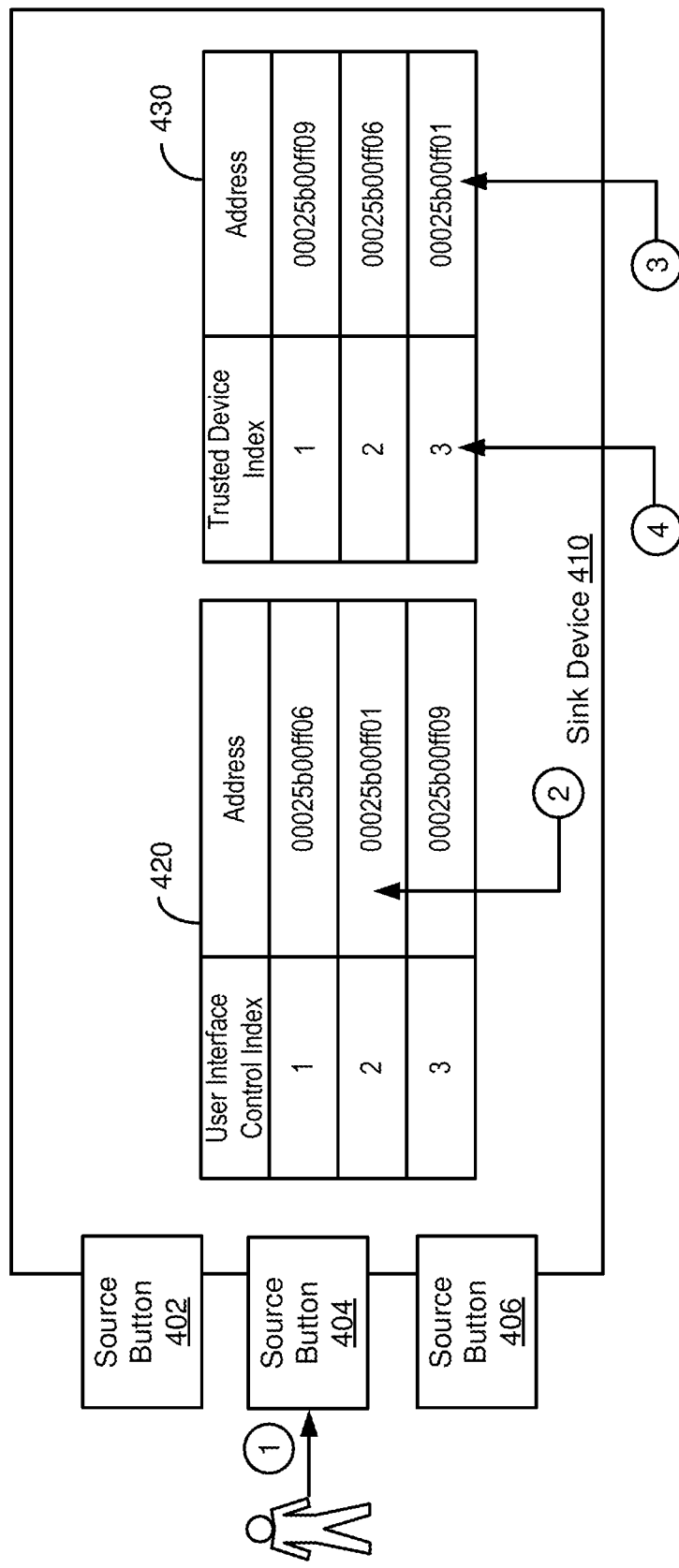
FIG. 4 illustrates components of an example sink device.

FIG. 4 illustrates components of an example sink device 410. The sink device 410 has three dedicated user interface controls: a first source button 402, a second source button 404, and a third source button 406.

The sink device 410 has a switching device table 420 that associates user interface control indexes with addresses of corresponding source devices. The sink device 410 also has a trusted device table 430 that associates trusted device indexes with addresses of corresponding source devices.

A user can cause the sink device to switch to a new audio source device by pressing any of the source buttons 402, 404, or 406.

For example during state 1, the user can press the second source button 404. During state 2, the sink device 410 can use a user interface control index corresponding to the selected second source button 404 as an index into the switching device table 420 to obtain the address of the requested audio source device.

During state 3, the sink device 410 searches the trusted device table 430 for a matching address. During state 4, after finding the matching address, the sink device 410 obtains the trusted device index of the requested audio source device. The sink device 410 can then use the trusted device index to connect to the requested audio source device.

If the sink device 410 was configured to switch between particular activities of a single source device, the sink device 410 will use an activity identifier stored in the switching device table 420 when establishing the connection with the requested audio source device. However, if the sink device 410 is already connected to the audio source device, the sink device 410 may not need to establish a new connection with the requested source device.

FIG. 5A shows an example of headphones connected to a battery charger. In this example, the headphone system 100 includes a battery 505 and an electrical input mechanism 510 disposed in the ear cup 105c. Here, the electrical input mechanism 510 is configured for electrical connection with the battery 505. The electrical input mechanism 510 is also configured for receiving power from the battery charger 515. According to this example, the electrical input mechanism 510 is configured for receiving power from the battery charger 515 via inductive charging. For example, the electrical input mechanism 510 may include one or more coils that are configured to convert energy from an electromagnetic field applied by the battery charger 515 into electrical current for charging the battery 505. In alternative examples, the electrical input mechanism 510 may include one or more pins, ports, plugs, sockets, etc., that are configured for conductive or wired charging.

In this example, the battery charger 515 includes an electrical output mechanism 530. According to this implementation, the electrical output mechanism 530 is configured for providing the electromagnetic field to the electrical input mechanism 510. Accordingly, the electrical output mechanism 530 may include one or more induction coils that are configured to generate an alternating electromagnetic field. In alternative examples, the electrical output mechanism 530 may include one or more pins, ports, plugs, sockets, etc., that are configured for conductive or wired charging.

In this implementation, the ear cup 105c also includes ear cup magnets 520a and 520b. In the example shown in FIG. 5A, the ear cup magnets 520a and 520b are configured to position the electrical input mechanism 510 for receiving power from the battery charger 515 when the ear cup magnets 520a and 520b are positioned proximate corresponding battery charger magnets 525a and 525b of the battery charger 515. According to this example, the ear cup magnets 520a and 520b are configured to align the electrical input mechanism 510 with the electrical output mechanism 530 when the ear cup magnets 520a and 520b are positioned proximate corresponding battery charger magnets 525a and 525b.

In this example, the hinge assembly is not visible from the exterior of the ear cups. When the battery charger 515 is positioned on a horizontal surface, the hinge assembly is configured to maintain the headband assembly 110 in a substantially vertical position when the ear cup magnets 520a and 520b are positioned proximate the battery charger magnets 525a and 525b, such that the ear cup 105d is suspended above at least a portion of the ear cup 105c and does not fall down. Accordingly, the hinge assembly is configured to maintain an alignment of the ear cup 105c and the ear cup 105d when the ear cup magnets 520a and 520b are positioned proximate the battery charger magnets 525a and 525b.

FIG. 5B shows example arrangements of ear cup magnets and an electrical input mechanism. As shown in FIG. 5A, FIG. 5B provides a bottom view of the ear cup 105c. In this example, the ear cup 105c includes two ear cup magnets, 520a and 520b, which are positioned on opposite sides of the ear cup 105c. In this example, both the ear cup magnet 520a and the ear cup magnet 520b have their south pole facing towards the outside of the ear cup 105c, which means that the south poles are facing towards the bottom of the ear cup 105c when the headphone system 100 is in the position shown in FIG. 5A. Other implementations may include different numbers of ear cup magnets, different positions of the ear cup magnets and/or different orientations of the ear cup magnets' poles.

In the example shown in FIG. 5B, the electrical input mechanism 510 is located in a central portion of the ear cup 105c. In FIG. 5B, the electrical input mechanism 510 and the ear cup magnets 520a and 520b are shown in dashed lines, indicating that they are positioned below an outside surface of the ear cup 105c. In this example, the electrical input mechanism 510 is a single coil. Other implementations may include different numbers of electrical input mechanisms, different positions of the electrical input mechanisms and/or different types of electrical input mechanisms.

FIG. 5C shows example arrangements of battery charger magnets and an electrical output mechanism. As shown in FIG. 5A, FIG. 5C provides a top view of the battery charger 515. In this example, the battery charger 515 includes four battery charger magnets. The battery charger magnets 525a and 525b have a polarity that is opposite from the polarity of the ear cup magnets 520a and 520b. In this example, the battery charger 515 also includes the battery charger magnets 525c and 525d, which have a polarity that is the same as that of the polarity of the ear cup magnets 520a and 520b.

According to this example, the battery charger magnets 525c and 525d, which have the same polarity as the ear cup magnets 520a and 520b, reside proximate to, and on opposing sides of, the battery charger magnet 525a, which has a polarity that is opposite from the polarity of the ear cup magnets 520a and 520b. Therefore, if a user were to position the ear cup 105c on the battery charger 515 such that the ear cup magnet 520a is slightly out of alignment with the battery charger magnet 525a, the battery charger magnet 525c would tend to repel ear cup magnet 520a and the battery charger magnet 525a would tend to attract the ear cup magnet 520a. Accordingly, the battery charger magnets having a polarity that is opposite from the polarity of the ear cup magnets are configured to align with the ear cup magnets.

In this example, the battery charger 515 also includes an electrical output mechanism 530. In FIG. 5C, the electrical output mechanism 530 and the battery charger magnets 525a-525d are shown in dashed lines, indicating that they are positioned below an outside surface of the battery charger 515. Here, electrical output mechanism 530 is configured for providing power to the electrical input mechanism 510 when the ear cup 105c is properly positioned on the battery charger 515. In this example, the electrical output mechanism 530 is a single coil. Other implementations may include different numbers of electrical output mechanisms, different positions of the electrical output mechanisms and/or different types of electrical output mechanisms.

Figure 5D:
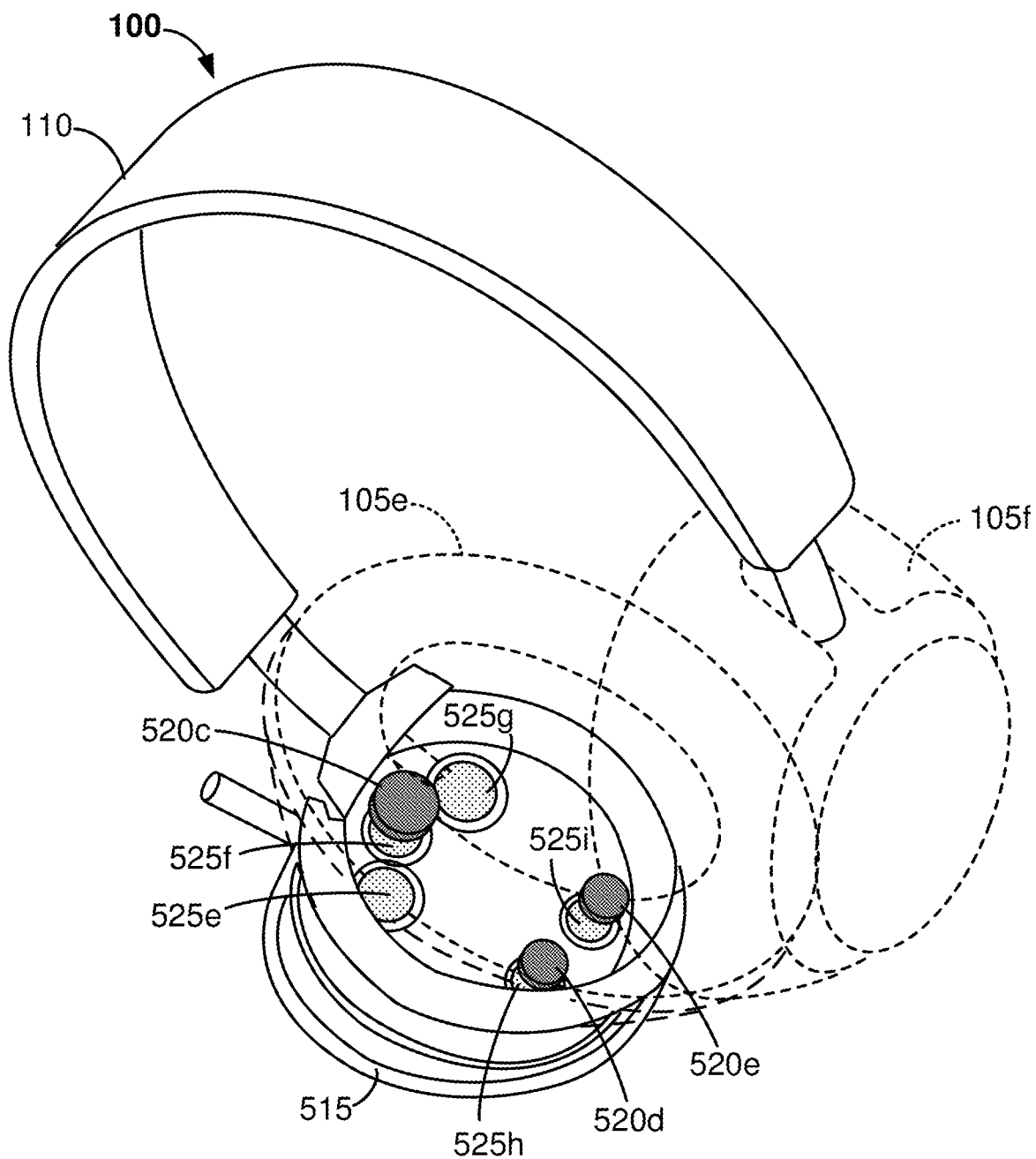
FIG. 5D shows another example of a headphone system that includes a charger stand.

FIG. 5D shows another example of a headphone system that includes a charger stand. In this example, the ear cups 105e and 105f are shown principally in dashed lines, allowing the ear cup magnets 520c-520e and the battery charger magnets 525e-525i to be seen. According to this implementation, the polarity of the ear cup magnets 520c-520e is opposite from that of the battery charger magnets 525f, 525h and 525i. Therefore, the ear cup magnets 520c-520e are configured to be aligned with the battery charger magnets 525f, 525h and 525i when the ear cup 105e is positioned on the battery charger 515.

In this example, the polarity of the ear cup magnets 520c-520e is the same as that of the battery charger magnets 525e and 525g. According to this example, the battery charger magnets 525e and 525g, which have the same polarity as that of the ear cup magnets 520c-520e, reside proximate to, and on opposing sides of, the battery charger magnet 525f, which has a polarity that is opposite from the polarity of the ear cup magnets 520c-520e. Therefore, the battery charger magnets 525e and 525g are configured to repel the ear cup magnets 520c-520e. Between the attraction of the battery charger magnets 525f, 525h and 525i, and the repulsion of the battery charger magnets 525e and 525g, the ear cup 105e and the battery charger 515 are configured to align properly with one another.

Figure 6A:
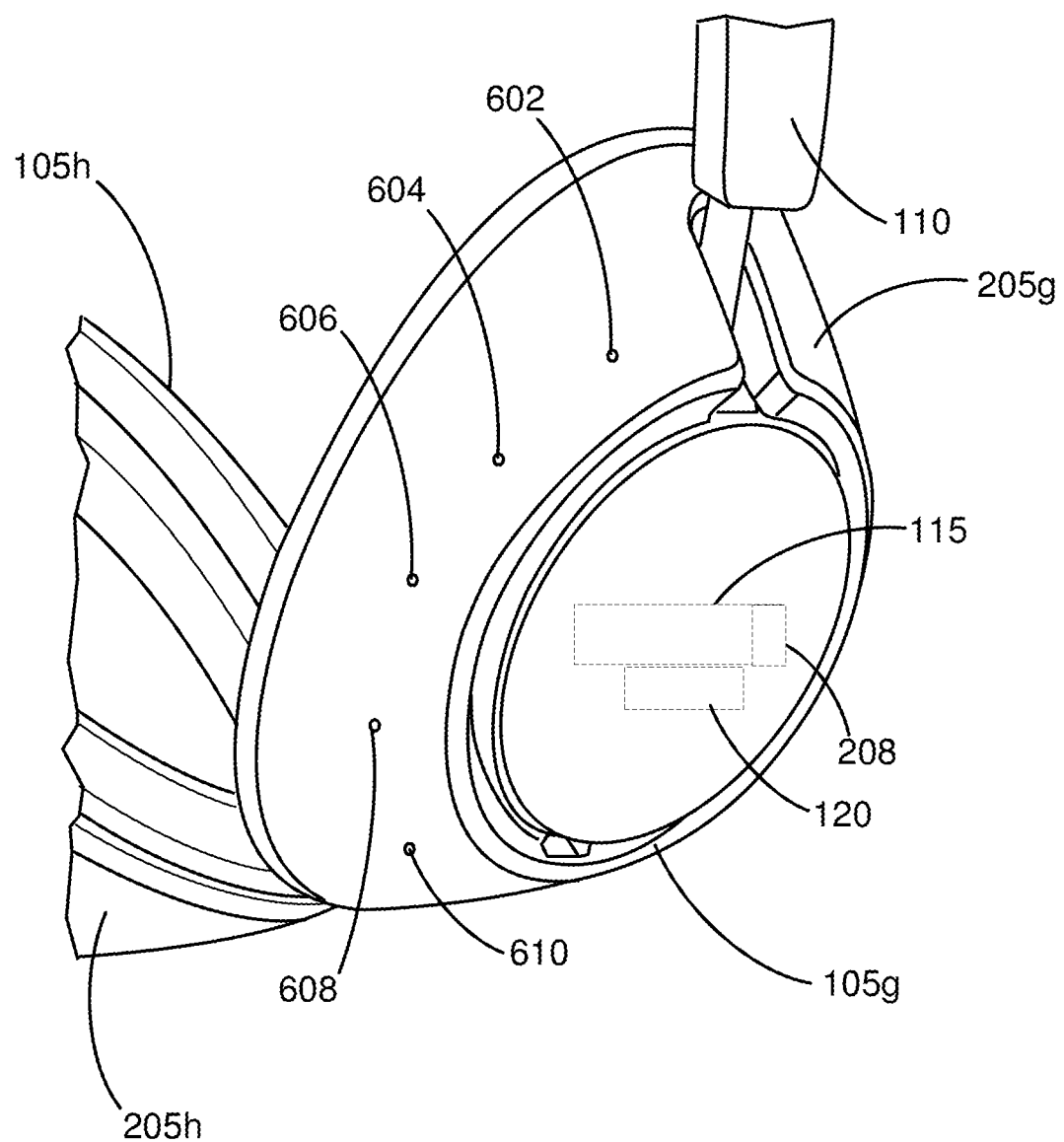
FIG. 6A shows an example of an alternative ear cup.

FIG. 6A shows an example of an alternative ear cup. In this example, the ear cup 105g includes input source buttons 602-610. In this implementation, each of the five input source buttons 602-610 is configured for selecting a corresponding source of audio data received via an interface system, which includes the wireless transceiver 208. In this example, the control system 120 is configured for controlling a speaker system of the ear cup 105g and the each cup 105h to reproduce the audio data received via the wireless transceiver 208 and selected by one of the input source buttons 602-610. In this example, the ear cup 105g and the each cup 105h each include a hinge assembly (not shown in FIG. 6A) configured for connecting the headband assembly 110 with each of the ear cups. However, as in previous examples, the hinge assembly is disposed within the ear cup enclosures 205g and 205h such that the hinge assembly is not visible from the exterior of the ear cups 105g and 105h.

Figure 6B:
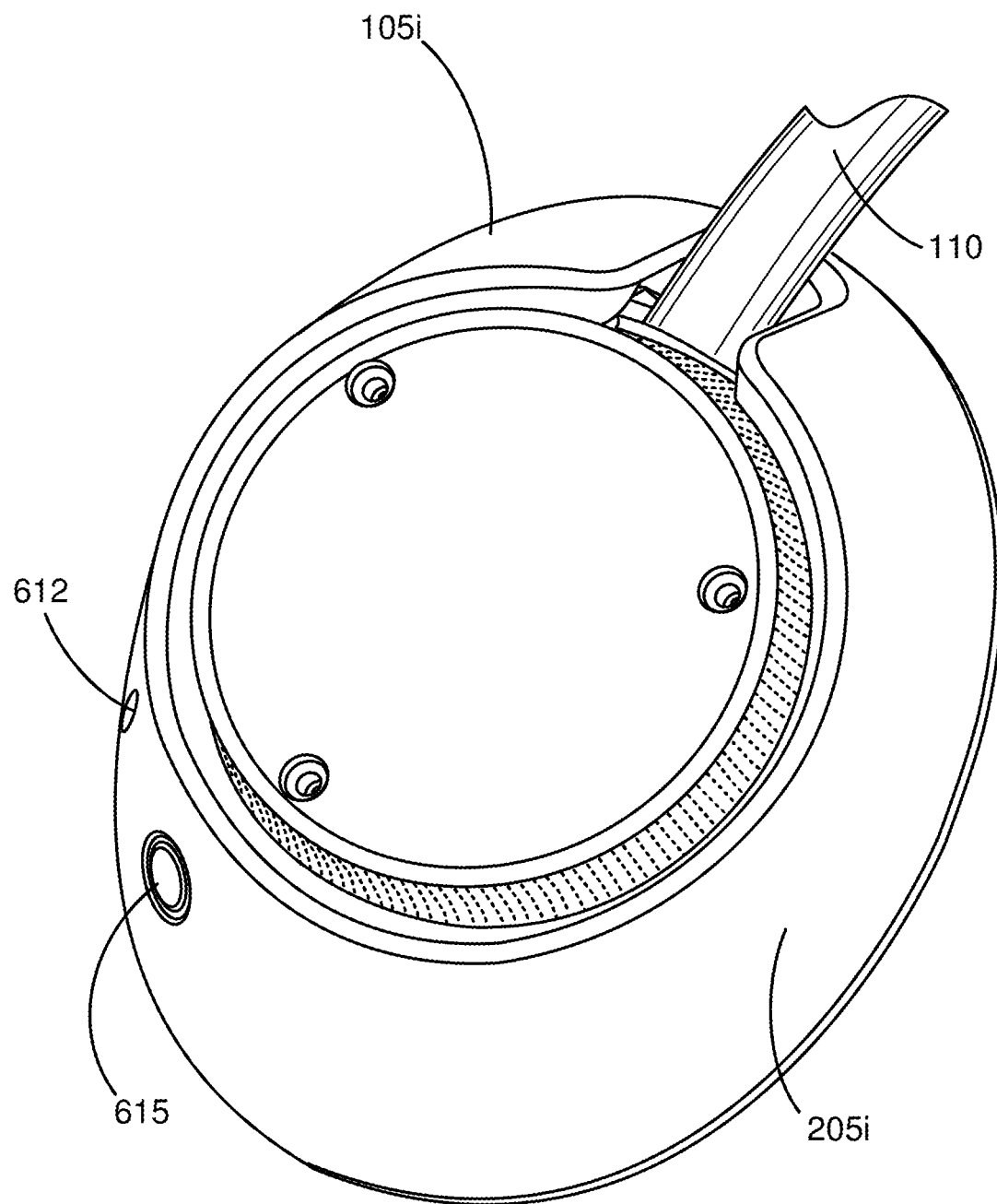
FIG. 6B shows an example of another alternative ear cup.

FIG. 6B shows an example of another alternative ear cup. In this example, the ear cup 105i includes the input source button 612, as well as additional source buttons that are not visible in FIG. 6B. In this implementation, each of the input source buttons is configured for selecting a corresponding source of audio data received via an interface system, which in this example includes a port 615 that is configured to receive a wired input, such as a headphone jack. In this example, the ear cup 105i includes a hinge assembly configured for connecting the headband assembly 110. However, as in previous examples, the hinge assembly is disposed within the ear cup enclosures 205i such that the hinge assembly is not visible from the exterior of the ear cup 105i.

According to some implementations, the hinge assembly of each ear cup is configured to pivot the ear cup around two axes. In some examples, the hinge assembly of each ear cup is configured to return the ear cup to a rest position after the ear cup has been displaced from the rest position.

Figure 7:
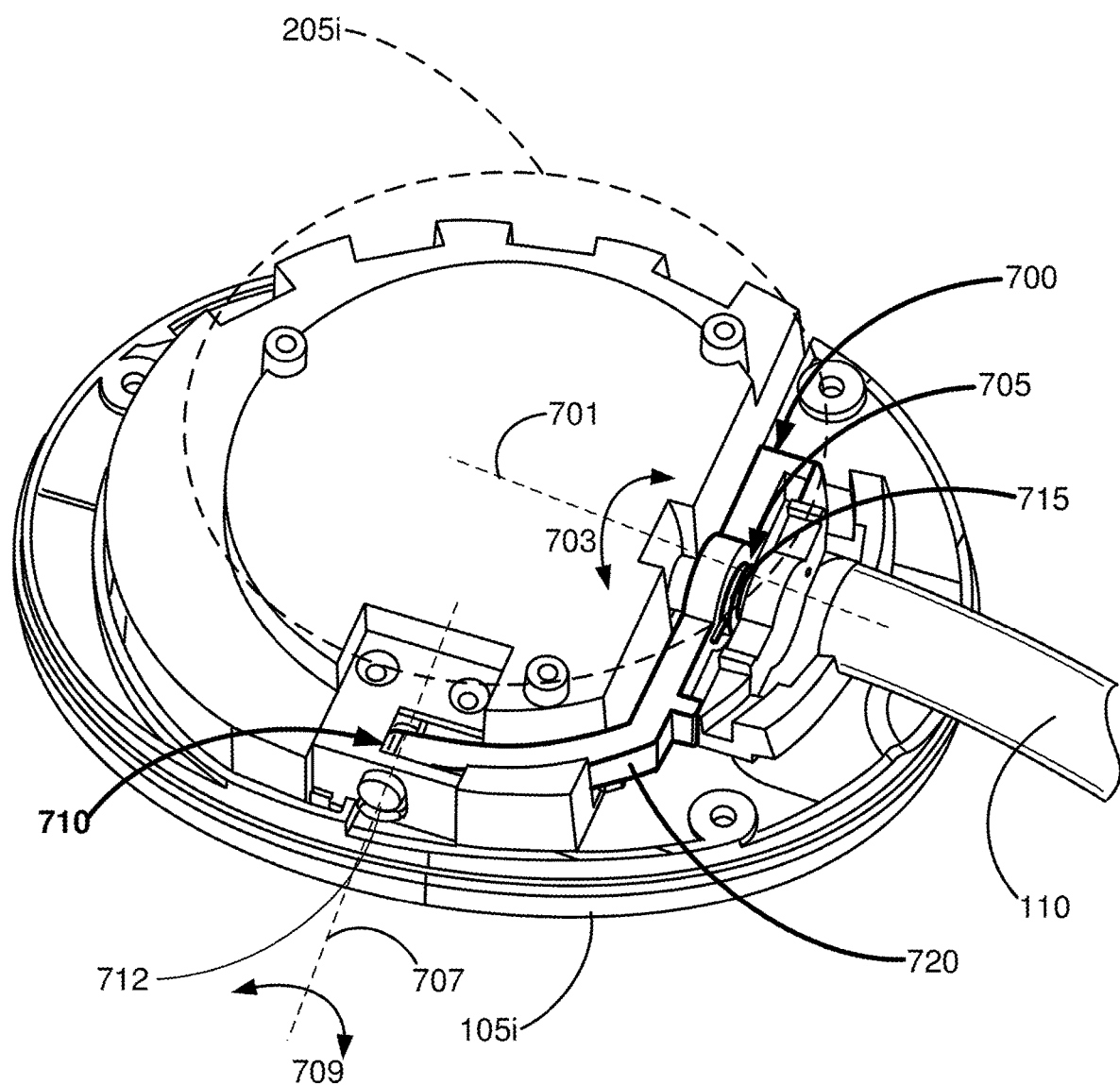
FIG. 7 shows one example of a hinge assembly.

FIG. 7 shows one example of a hinge assembly. In FIG. 7, the outline of the ear cup enclosure 205i is shown in dashed lines, indicating that the viewer can see through the ear cup enclosure 205i to the underlying elements. In this example, the hinge assembly 700 includes an arm 720. According to this implementation, a first portion of the arm 720 is attached to the camber pivot assembly 710 and a second portion of the arm 720 is attached to the swivel pivot assembly 705. The swivel pivot assembly 705 is also configured for attachment with the headband assembly 110, only a portion of which is shown in FIG. 7.

In this implementation, the swivel pivot assembly 705 is configured to allow the ear cup 105i to swivel around the axis 701, as indicated by the arrows 703. The axis 701 may, for example, correspond with a long axis of the headband assembly 710. In some examples, the swivel pivot assembly 705 may be configured to allow the ear cup 105i to swivel within a swivel angle range. In some examples, the swivel angle range may be in the range of +/−5 degrees, +/−10 degrees, +/−15 degrees, +/−20 degrees, etc.

In the example shown in FIG. 7, the swivel pivot assembly 705 includes the spring 715. According to some such examples, the swivel angle range may be controlled, at least on part, according to the stiffness of the spring 715. Alternatively, or additionally, the swivel angle range may be controlled, at least on part, by one or more stops, or similar structures, that limit the rotation of the arm 720 around the axis 701. In this example, the spring 715 of the swivel pivot assembly 705 is configured to return the ear cup 105i to a rest position after the ear cup has been displaced from the rest position. The rest position may correspond to a local potential energy minimum. The swivel pivot assembly 705 may allow the headband assembly 710 to maintain a substantially vertical position when the headphone system 100 is placed on the battery charger 515.

According to this implementation, the camber pivot assembly 710 is configured to allow the ear cup 105i to rotate around the axis 707, as indicated by the arrows 709. In this example, the axis 707 corresponds with an axis of the hinge 712. According to some implementations, another instance of the arm 720 may be attached to a hinge on the opposite side of the ear cup 105i from the hinge 712.

In some examples, the camber pivot assembly 710 may be configured to allow the ear cup 105i to rotate within a camber angle range. In some examples, the camber angle range may be in the range of +/−5 degrees, +/−10 degrees, +/−15 degrees, +/−20 degrees, etc. In some examples, the camber pivot assembly 710 may include a spring in the hinge 712. According to some such examples, the camber angle range may be controlled, at least on part, according to the stiffness of the spring. Alternatively, or additionally, the camber angle range may be controlled, at least on part, by a friction fit, by one or more stops, or similar structures, that limit the rotation of the arm 720 around the axis 707. In some examples, the camber pivot assembly 710 may be configured to return the ear cup 105i to a rest position after the ear cup has been displaced from the rest position.

Figure 8:
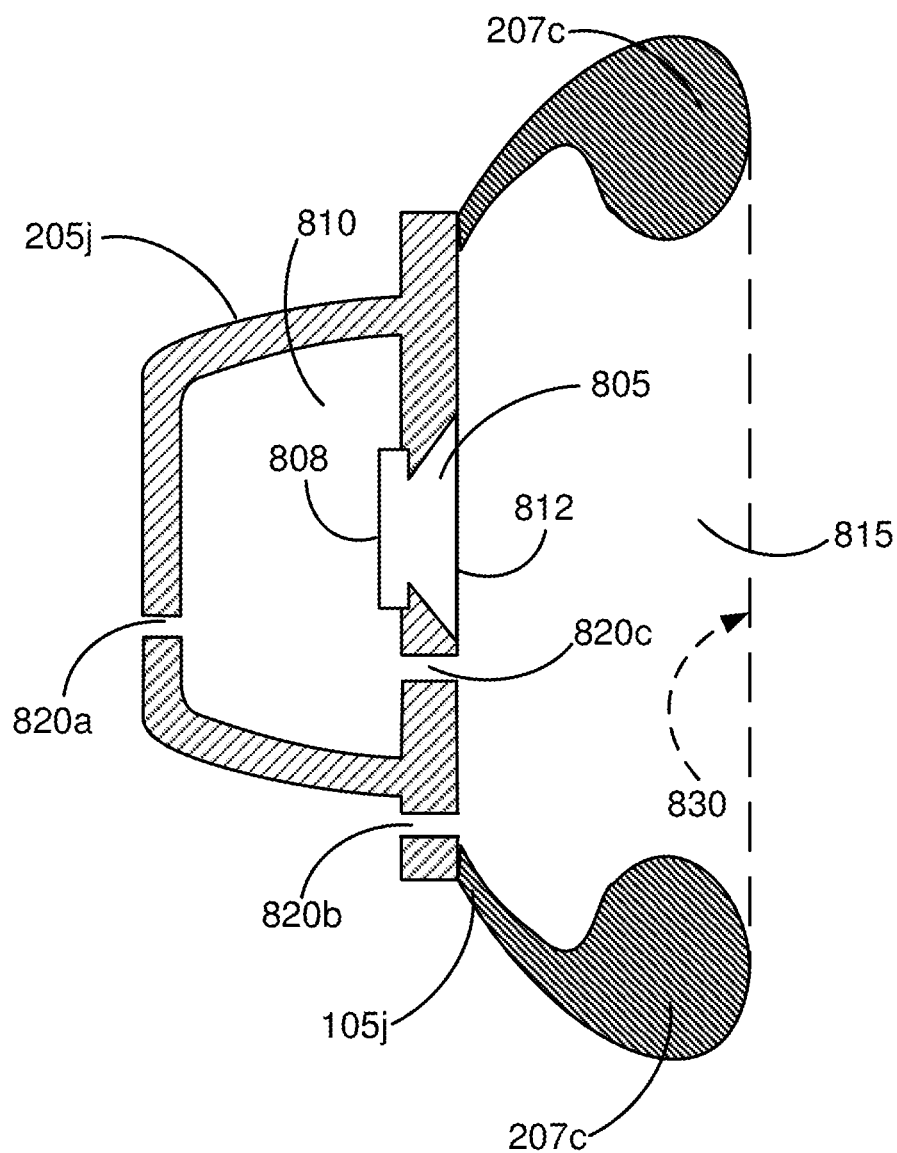
FIG. 8 shows a simplified cross-sectional view of an ear cup according to one example.

FIG. 8 shows a simplified cross-sectional view of an ear cup according to one example. In this implementation, the ear cup 105j includes a speaker system 805. Although the representation of the speaker system 805 that is shown in FIG. 8 only includes a single speaker, in some implementations the speaker system 805 may include multiple speakers. In this example, the ear cup 105j includes a rear air volume 810 between a first side 808 of the speaker system 805 and the ear cup enclosure 205j. In a typical headphone ear cup, the rear volume may be 25 cubic centimeters or more. However, in some implementations disclosed herein, the rear air volume 810 may be less than 25 cubic centimeters, or even less than 20 cubic centimeters. For example, in some implementations the rear air volume 810 is in the range of 1 to 20 cubic centimeters. According to some such implementations, the rear air volume 810 may be approximately 10 cubic centimeters.

In this implementation, the ear cup 105j includes a front air volume 815 proximate a second side 812 of the speaker system 805 and proximate the ear pad assembly 207c. The dashed line 830 indicates an approximate boundary of the front air volume 815. When the ear cup 105j is in use, the dashed line 830 may indicate an approximate position where the ear pad assembly 207c seals against a person's hear and/or ear.

As noted above, headphones that provide at least some degree of sound occlusion provide various potential benefits, such an improved ability to control audio quality. Other benefits include attenuation of potentially annoying or distracting sounds from the outside world. Headphones that are substantially sealed can substantially occlude sounds from the outside world. However, sealed headphones have some disadvantages. For example, if a user is changing elevation while wearing sealed headphones, a pressure differential may develop between air inside the ear cups and the outside atmospheric pressure.

This is one reason that some headphones include one or more vents between air volumes inside the ear cups and the outside atmosphere. Vents can also minimize the differences heard when the seal of the ear pad is variable. The ear pad may not always be sealed, for example, because a person using the headphones may be wearing eyeglasses. Vents also may be used to tune the bass and mid-bass response of the headphones.

In the example shown in FIG. 8, the ear cup 105*j* includes a vent 820*a* between the exterior of the ear cup 105*j* and the rear air volume 810, a vent 820*b* between the exterior of the ear cup 105*j* and the front air volume 815, and a vent 820*c* between the front air volume 815 and the rear air volume 810. The number and locations of vents shown in FIG. 8 are merely shown by way of example. Alternative implementations may include more or fewer vents.

However, some implementations include at least one vent disposed between an exterior of the ear cup 105*j* and the front air volume 815 (such as the vent 820*b*), at least one vent disposed between an exterior of the ear cup 105*j* and the rear air volume 810 (such as the vent 820*a*), or both. In other words, some implementations include at least one vent disposed between an exterior of the ear cup 105*j* and the front air volume 815, and at least one vent disposed between an exterior of the ear cup 105*j* and the rear air volume 810.

Although vented headphones provide some potential advantages, the vents can create challenges. For example, a person wearing vented headphones may be able to hear more sound from the outside world. This can be advantageous in some regards, such as for pedestrian safety, for providing an increased level of social awareness, etc. However, the inclusion of more sound from the outside world can create challenges in terms of the accurate playback of audio data. This is true in part because the sounds from the outside world can change in volume, frequency content, etc. Moreover, air flowing through the vents can create noise. The movement of speakers of the speaker system 805, for example, may cause air to flow through one or more of the vents 820*a*-820*c*, which can create noise.

Some implementations include an acoustic low-pass filter in each of one or more vents of a headphone system. For example, some implementations include an acoustic low-pass filter in a vent between the exterior of the ear cup 105*j* and the front air volume 815. Alternatively, or additionally, some implementations include an acoustic low-pass filter in a vent between the exterior of the ear cup 105*j* and the rear air volume 810. Alternatively, or additionally, some implementations include an acoustic low-pass filter in a vent between the front air volume 815 and the rear air volume 810.

In some implementations, the acoustic low-pass filter is configured to attenuate higher-frequency sounds produced by air flowing through a vent. According to some examples, the acoustic low-pass filter may include one or more expansion chambers.

Figure 9:
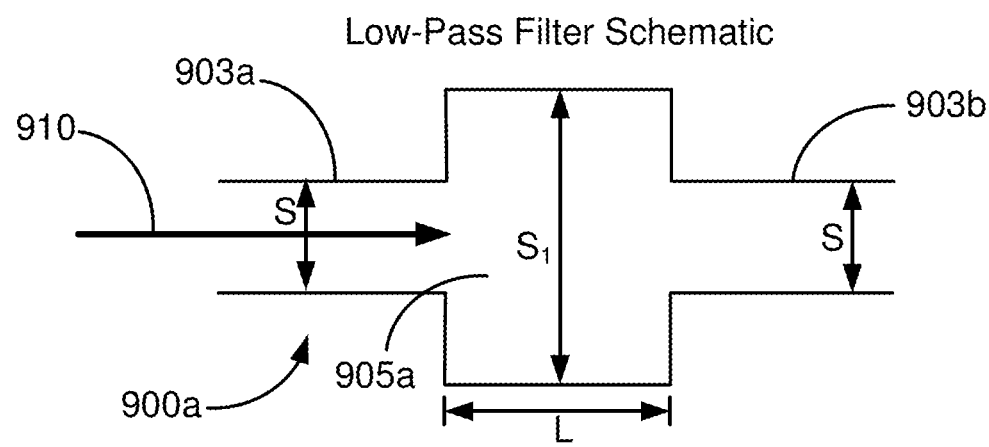
FIG. 9 shows a cross-section through one example of an acoustic low-pass filter.

FIG. 9 shows a cross-section through one example of an acoustic low-pass filter. In this example, the acoustic low-pass filter 900*a* includes the vent portions 903*a* and 903*b*, each of which has a cross-sectional area S. According to this implementation, the acoustic low-pass filter 900*a* includes an expansion chamber 905*a*, having a cross-sectional area $S_1$ and a length L. When air flows from the vent portion 903*a* or the vent portion 903*b* into the expansion chamber 905*a* (e.g., as shown by the arrow 910), the air pressure decreases. The resulting power transmission coefficient for the acoustic low-pass filter, which may be referred to as $T_\Pi$, may be expressed as follows:

$$T_\Pi \approx \frac{1}{1+\left(\frac{S_1-S}{2S}kL\right)^2} \quad \text{(Equation 1)}$$

Figure 11:
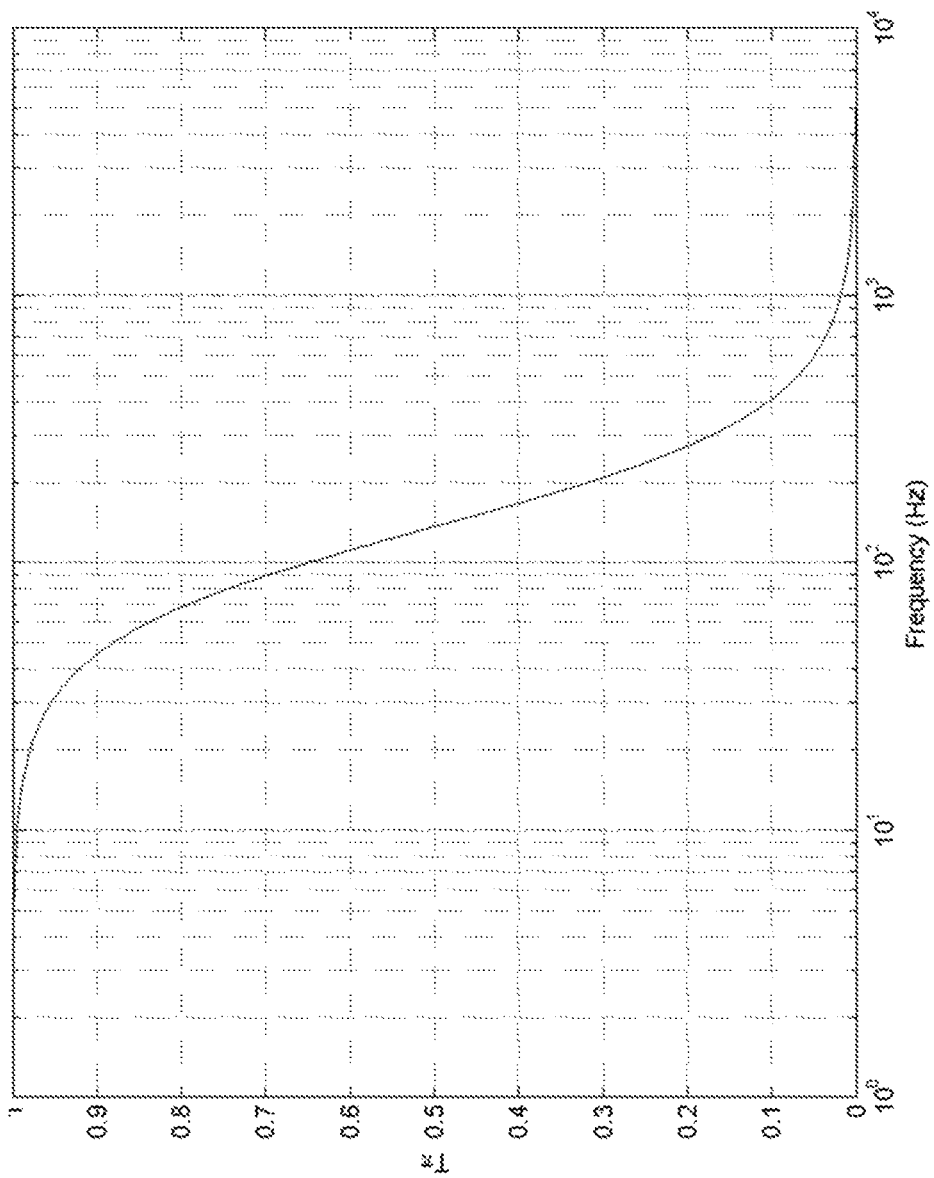
FIG. 11 is a graph that shows an example of the power transmission coefficient versus frequency for an acoustic low-pass filter.

In Equation 1, k represents the wavenumber. FIG. 11 is a graph that shows an example of the power transmission coefficient versus frequency for an acoustic low-pass filter. In this example, the area of the expansion chamber 905*a* ($S_1$) is five times the area of the vent portions 903*a* and 903*b* (S).

The cut-off frequency $f_c$ for this type of acoustic low-pass filter may be expressed as follows:

$$f_c = cS/(\Pi L(S_1-S)) \quad \text{(Equation 2)}$$

In Equation 2, c represents the speed of sound. By selecting appropriate dimensions of the acoustic low-pass filter 900*a*, sounds produced by headphone vents, particularly higher-frequency sounds, may be significantly attenuated.

Figure 12:
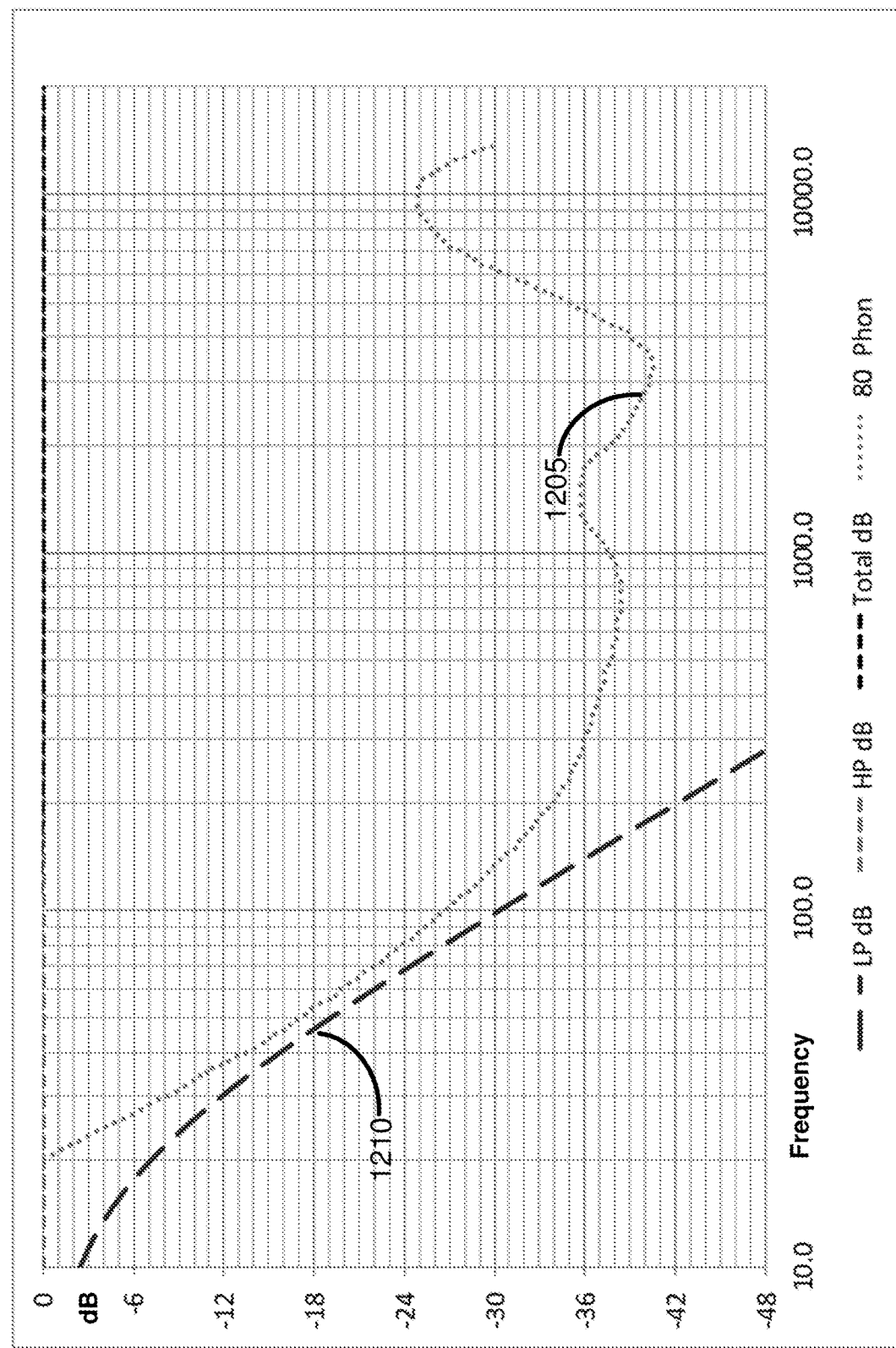
FIG. 12 is a graph that shows the effect of one example of an acoustic low-pass filter.

FIG. 12 is a graph that shows the effect of one example of an acoustic low-pass filter. In this example, the curve 1205 represents an equal-loudness contour for 80 phons and the curve 1210 represents the effect of the acoustic low-pass filter on sounds produced by a vent. Here, the curve 1210 is below the level of the curve 1205, which indicates that most human beings would not be able to hear the vent sounds due to the effect of the acoustic low-pass filter. In this example, the cut-off frequency is 18 Hz.

In one such example, the vent portions 903*a* and 903*b*, as well as the expansion chamber 905*a*, are rectangular in cross-section. In this example, the vent portions 903*a* and 903*b* have a height of 1 mm and a width of 0.28 mm, whereas the expansion chamber 905*a* has a height of 4 mm and a width of 12.56 mm. However, these values are merely provided by way of example. Similar effects may be produced with other dimensions of the vent portions 903*a* and 903*b*, and the expansion chamber 905*a*.

Figure 10:
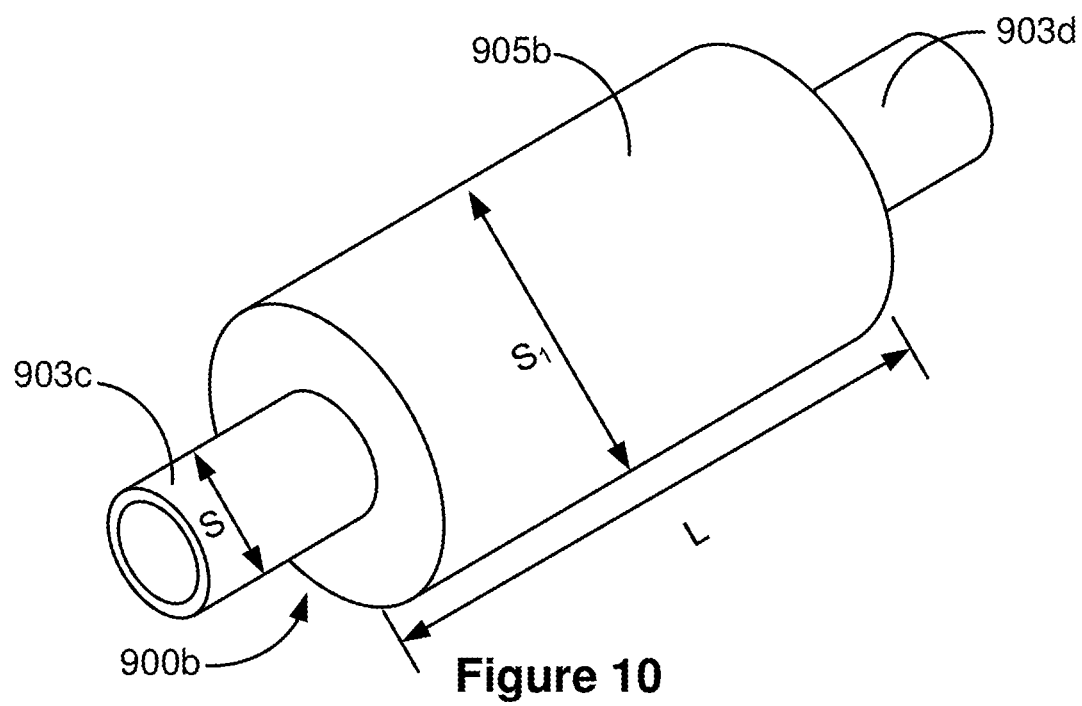
FIG. 10 shows a perspective view of another example of an acoustic low-pass filter.

FIG. 10 shows a perspective view of another example of an acoustic low-pass filter. In this example, the acoustic low-pass filter 900*b* includes an expansion chamber 905*a*, having an area $S_1$ and a length L. According to this implementation, the acoustic low-pass filter 900*b* includes the vent portions 903*c* and 903*d*, each of which has an area S.

According to one example, the acoustic low-pass filter 900*b* may produce an effect like that shown in FIG. 12. In one such example, the vent portions 903*c* and 903*d* have a diameter of 0.6 mm, whereas the expansion chamber 905*b* has a diameter of 8 mm. These values are merely provided by way of example. Similar effects may be produced with other dimensions of the vent portions 903*c* and 903*d*, and the expansion chamber 905*b*.

Figure 13:
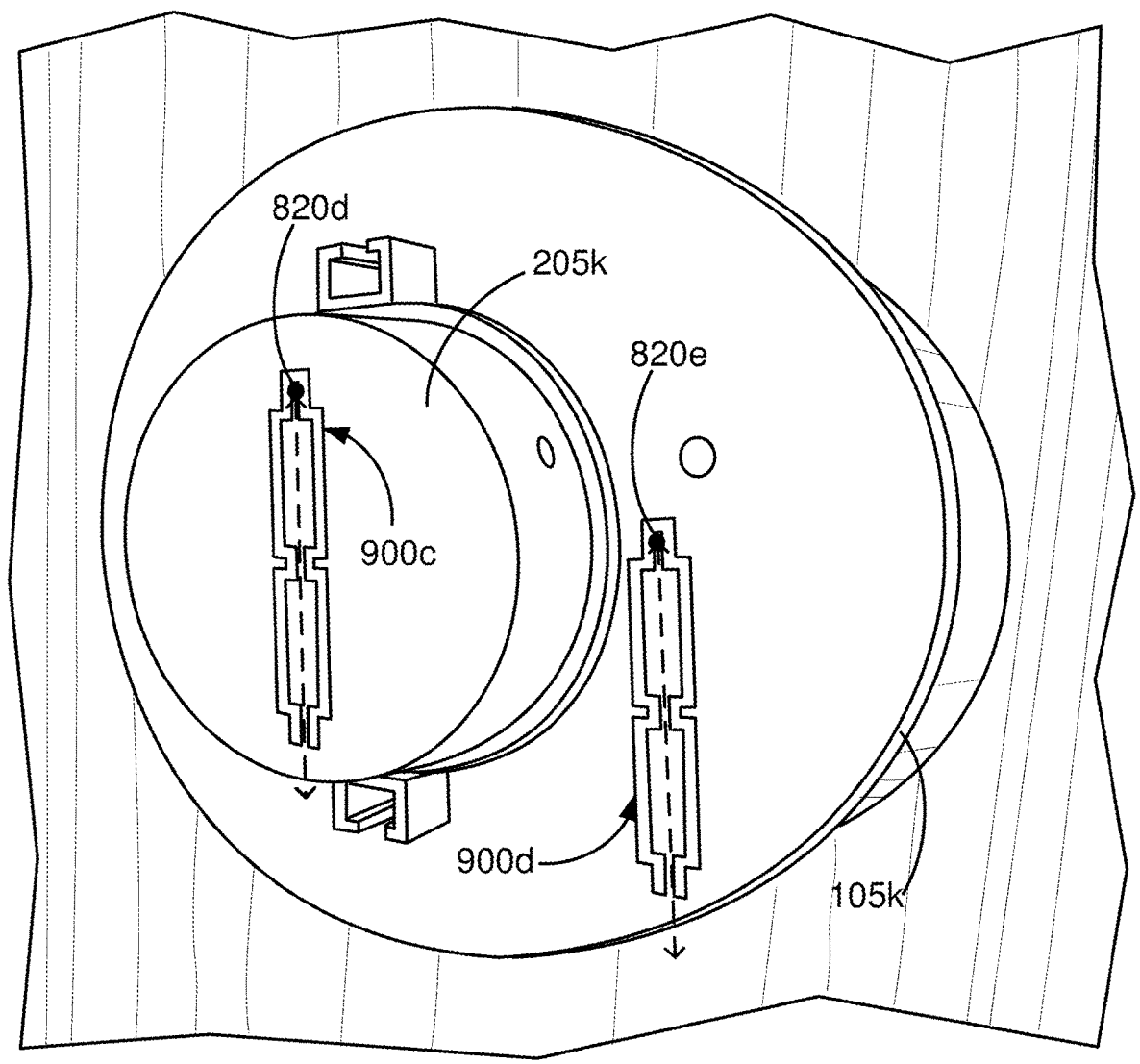
FIG. 13 shows examples of acoustic low-pass filters in an ear cup.

FIG. 13 shows examples of acoustic low-pass filters in an ear cup. In this example, the ear cup 105*k* includes the acoustic low-pass filters 900*c* and 900*d*, cross-sections of which are shown in FIG. 13. In these examples, the acoustic low-pass filters 900*c* and 900*d* each include two expansion chambers. Having two expansion chambers can further enhance the effect of the acoustic low-pass filters 900*c* and 900*d*. The acoustic low-pass filter 900*c* is configured to connect with, and be a part of, the vent 820*d*. The vent 820*d* allows air to pass between the outside atmosphere and a rear air volume between a speaker system (not shown) and the ear cup enclosure 205*k*. The acoustic low-pass filter 900*d* is configured to connect with, and be a part of, the vent 820*e*. The vent 820*e* allows air to pass between the outside atmosphere and a front air volume, via the acoustic low-pass filter 900*d*.

Figure 14A:
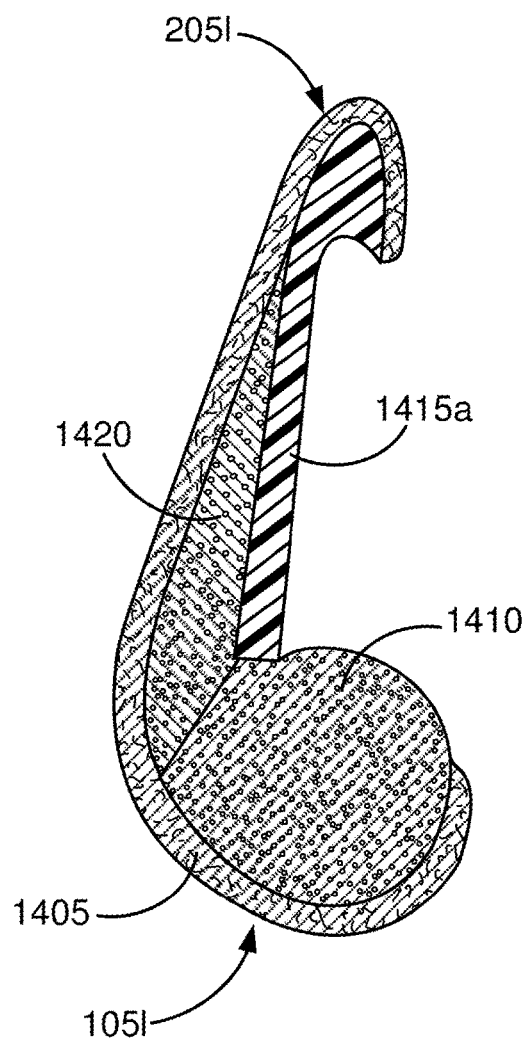
FIGS. 14A and 14B show examples of cross-sections through two ear cup enclosure implementations.
Figure 14B:
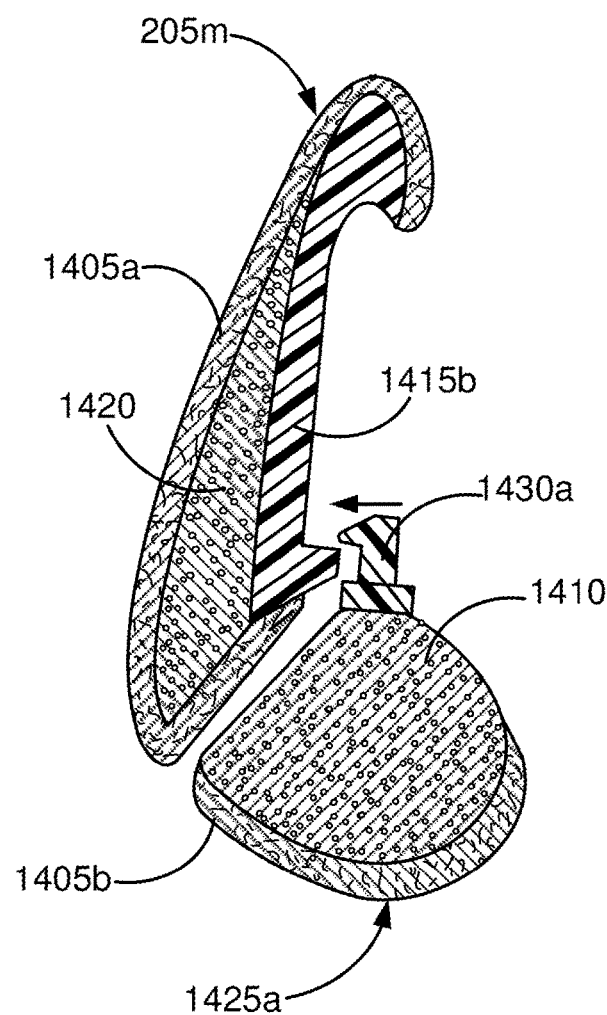

FIGS. 14A and 14B show examples of cross-sections through two ear cup enclosure implementations. As with other figures disclosed herein, the dimensions of the elements shown in FIGS. 14A and 14B are not necessarily drawn to scale. Moreover, the number of elements, arrangements of elements and types of elements shown in FIGS. 14A and 14B are merely made by way of example.

In the example shown in FIG. 14A, the ear cup enclosure 205l includes a single piece of flexible material 1405 that encloses the ear cup 105l, at least in part. The single piece of flexible material 1405 may for example, include leather or a leather-like material such as polyurethane leather. According to this implementation, the single piece of flexible material 1405 encloses a support structure 1415a, the overmold foam 1420 that is disposed on the support structure 1415a, and the ear pad foam 1410. In some examples, the support structure 1415a may include a plastic material.

However, in the example shown in FIG. 14B, the ear cup enclosure 205m includes a first portion 1405a of flexible material that encloses the support structure 1415b and the overmold foam 1420 that is disposed on the support structure 1415b. In this implementation, a second portion 1405b of the flexible material encloses the ear pad foam 1410 of the ear pad assembly 1425a. In this example, the ear pad assembly 1425a also includes a fastener 1430a for connecting the ear pad assembly 1425a with the support structure 1415b.

Figure 15A:
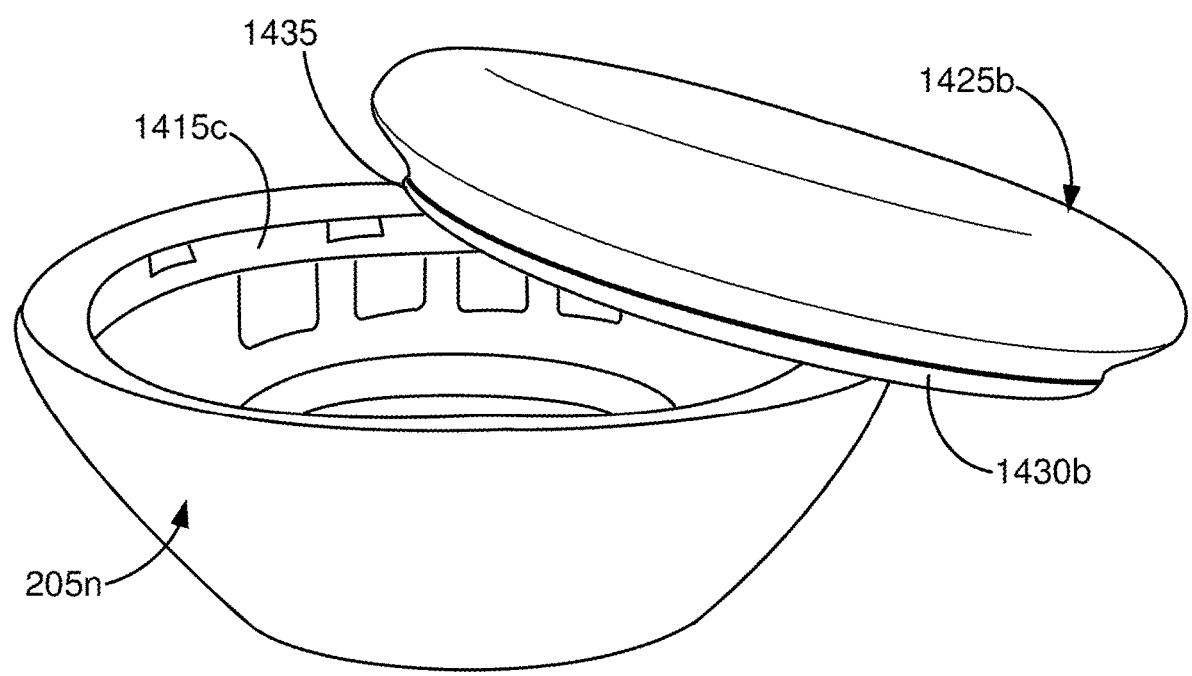
FIGS. 15A and 15B show examples of an ear pad assembly that is detached from a corresponding ear cup enclosure.
Figure 15B:
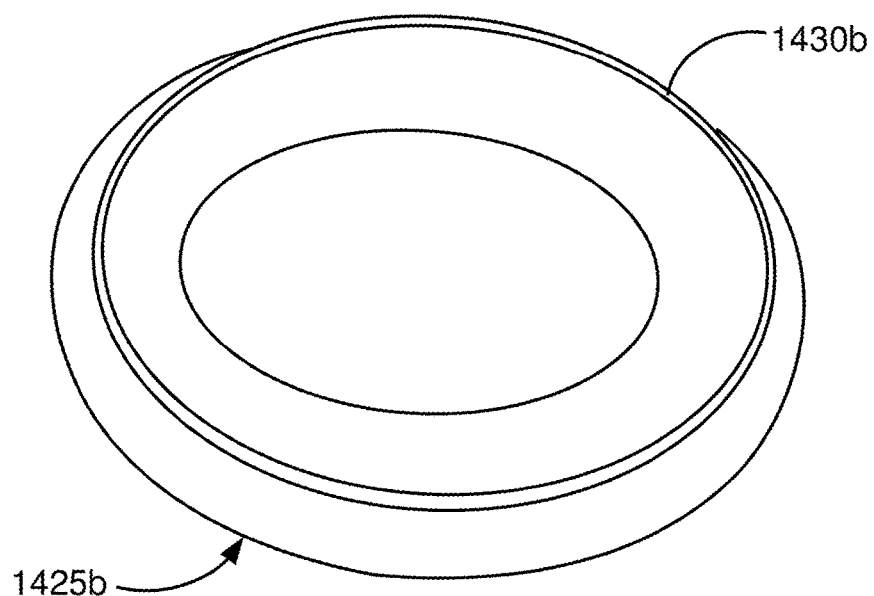

FIGS. 15A and 15B show examples of an ear pad assembly that is detached from a corresponding ear cup enclosure. Like FIG. 14B, these examples also include an ear pad assembly 1425b having a fastener 1430b for connecting the ear pad assembly 1425b with a support structure 1415c of the ear cup enclosure 205n. In these examples, the faster 1430b is in the shape of a ring. In these examples, the fastener 1430b includes a lip 1435 that is configured for connecting the ear pad assembly 1425b with the support structure 1415c.

Figure 16:
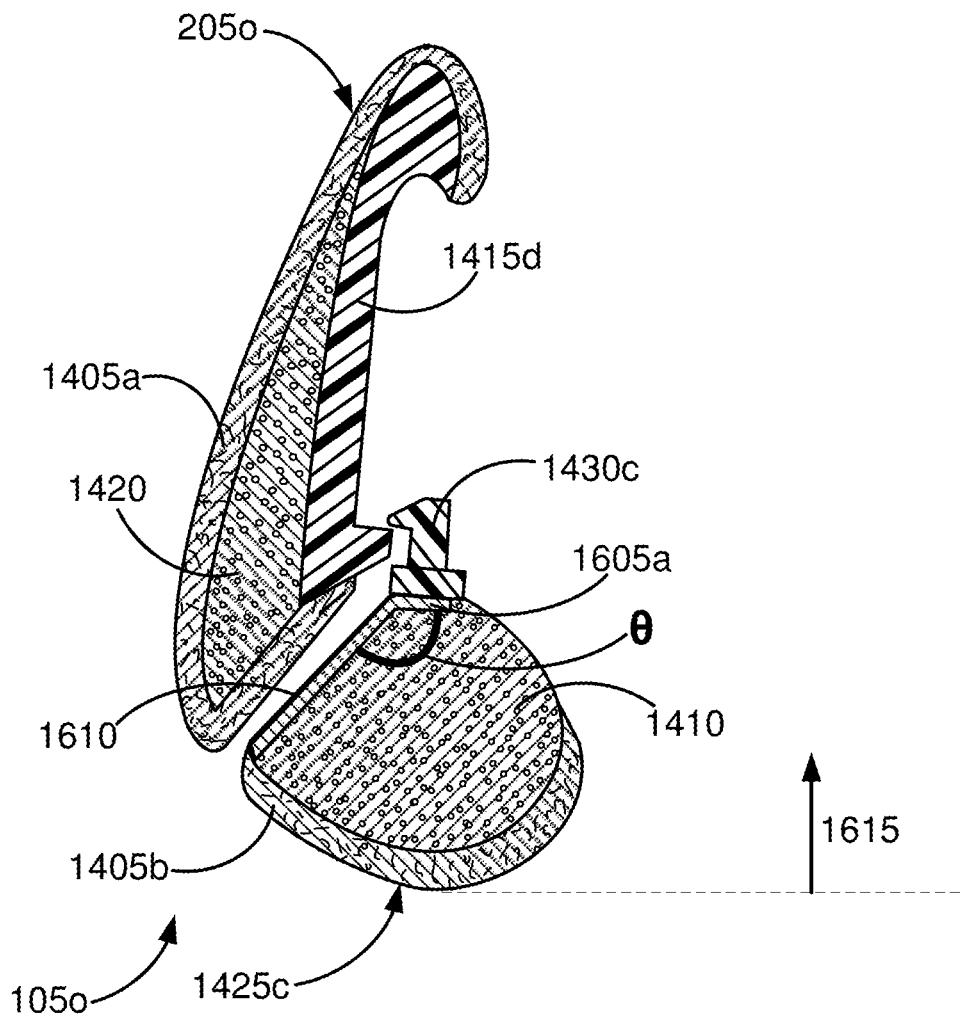
FIG. 16 shows another example of a cross-section through an ear cup enclosure implementation.

FIG. 16 shows another example of a cross-section through an ear cup enclosure implementation. In this example, the ear pad assembly 1425c includes an ear pad support structure 1605a proximate the ear pad foam 1410. The ear pad support structure 1605a may include a flexible material such as a plastic, fabric, rubber, etc., depending on the particular implementation. The ear pad support structure 1605a may provide additional stiffness to the ear pad assembly 1425c, which may allow the ear pad assembly 1425c to be secured to the ear cup enclosure 205o without causing a large gap or a bulge between the ear cup enclosure 205o and the ear pad assembly 1425c. However, it is preferable that the ear pad support structure 1605a not be so stiff and/or so thick as to cause discomfort to a person wearing the headphones. In this example, the ear pad assembly 1425c also includes an adhesive layer 1610 for securing the ear pad assembly 1425c to the ear cup enclosure 205o.

In this example, the ear pad support structure 1605a helps to provide a low-profile design for the ear cup 1050: instead of being defined by large, exposed ear pads, the shape of the ear cup 105o will principally be defined by the tapered profile of the ear cup enclosure 205o. As shown in FIG. 2A and described above, in some implementations only a portion of the ear pad assembly 1425c will be visible when the ear cup 105o is being worn, because a substantial portion of the ear pad assembly 1425c will be positioned within the ear cup enclosure 205o.

Referring again to FIG. 16, when the ear cup 105o is worn, the ear cup 105o will be compressed in the direction of the arrow 1615. By having the ear pad assembly 1425c meet the ear cup enclosure 205o at an angle, which is at least partially defined by the angle θ of the ear pad support structure 1605a, both the ear pad foam 1410 of the ear pad assembly 1425c and the overmold foam 1420 of the ear cup enclosure 205o will be compressed in the general direction of the arrow 1615 when the ear cup 105o is worn. According to some implementations, the angle θ of the ear pad support structure 1605a may be in the range of 140 degrees to 170 degrees. In some examples, approximately half of the compression may be taken by the ear pad foam 1410 and approximately half of the compression may be taken by the overmold foam 1420. In one example in which the ear cup 105o is compressed by approximately 15 mm when the ear cup 105o is worn, the overmold foam 1420 is compressed by approximately 8 mm and the ear pad foam 1410 is compressed by approximately 7 mm.

Figure 17A:
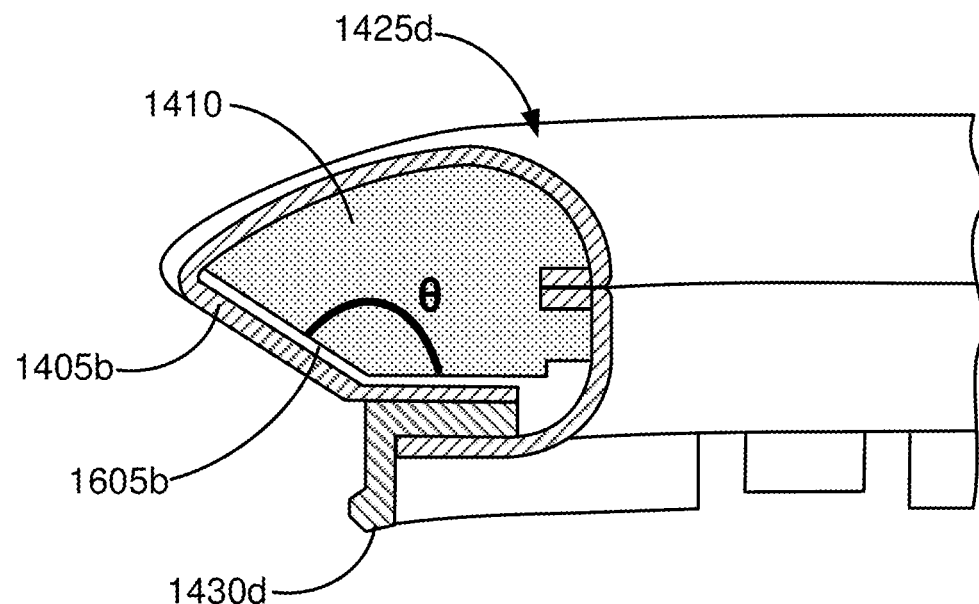
FIGS. 17A and 17B show example cross-sections through alternative ear pad assemblies.
Figure 17B:
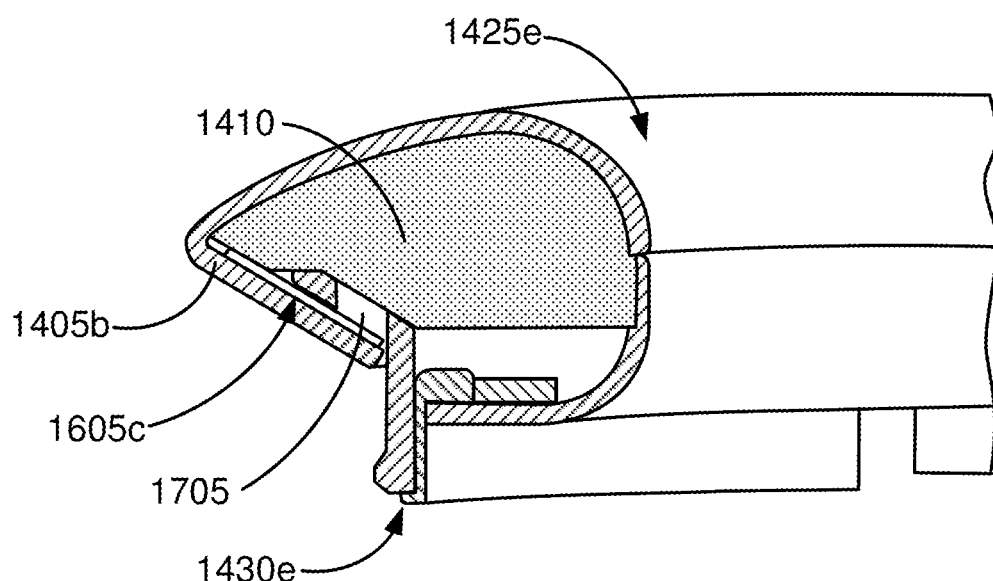

FIGS. 17A and 17B show example cross-sections through alternative ear pad assemblies. In the example shown in FIG. 17A, the ear pad assembly 1425d includes an ear pad support structure 1605b proximate the ear pad foam 1410. The flexible material 1405b encloses the ear pad foam 1410 and the ear pad support structure 1605b. The ear pad support structure 1605b may include a flexible material such as a plastic, fabric, rubber, etc., depending on the particular implementation. Here, the ear pad support structure 1605b is attached to the fastener 1430d. According to some implementations, the angle θ of the ear pad support structure 1605b may be in the range of 140 degrees to 170 degrees.

In the example shown in FIG. 17B, the ear pad assembly 1425e includes an ear pad support structure 1605c proximate the ear pad foam 1410. In this example, a support member 1705 is attached to the ear pad support structure 1605c. The support member 1705 provides additional stiffness to the ear pad assembly 1425e. In this example, both the ear pad support structure 1605c and the support member 1705 are attached to the fastener 1430e. In some implementations, the support member 1705 may be a part of the fastener 1430e.

Various modifications may be made to the implementations described in this disclosure. For example, some implementations may also involve providing microphone data to a user. The microphone data may provide sounds from the outside world. In some examples, the headphone system 100 may include a microphone system that includes one or more microphones, and/or an inertial sensor system that includes one or more inertial sensors. The inertial sensors may, for example, include one or more accelerometers or gyroscopes.

The general principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

The invention claimed is:
1. A headphone system, comprising:
two ear cups, each ear cup comprising:
an ear cup enclosure;
an ear pad assembly;
a hinge assembly disposed within the ear cup enclosure such that the hinge assembly is not visible from the exterior of the ear cup; and
a speaker system including at least one speaker;
a headband assembly configured for connecting with each of the ear cups, via the hinge assembly;
an interface system, comprising:
at least one interface; and
a plurality of input source buttons disposed on at least one of the ear cups, each of the input source buttons configured for selecting a corresponding source of audio data received via the at least one interface;
a battery;

an electrical input mechanism disposed in a first ear cup, the electrical input mechanism configured for receiving power from a battery charger;
at least two ear cup magnets disposed in the first ear cup, the ear cup magnets configured to position the electrical input mechanism for receiving power from the battery charger when the ear cup magnets are positioned proximate corresponding battery charger magnets of the battery charger; and
a control system configured for controlling the speaker system of each ear cup to reproduce the audio data received via the interface and selected by one of the input source buttons.

2. The headphone system of claim 1, further comprising the battery charger, wherein the battery charger comprises:
an electrical output mechanism configured for providing power to the electrical input mechanism; and
at least four battery charger magnets, two of the battery charger magnets having a same polarity as the ear cup magnets and two of the battery charger magnets having a polarity that is opposite from the polarity of the ear cup magnets.

3. The headphone system of claim 2, wherein the battery charger magnets having a polarity that is opposite from the polarity of the ear cup magnets are configured to align with the ear cup magnets.

4. The headphone system of claim 2, wherein the battery charger magnets having the same polarity as the ear cup magnets reside proximate to, and on opposing sides of, one of the battery charger magnets having a polarity that is opposite from the polarity of the ear cup magnets.

5. The headphone system of claim 2, wherein the battery charger magnets having the same polarity as the ear cup magnets, in combination with the battery charger magnets having the polarity that is opposite from the polarity of the ear cup magnets, are configured to cause an ear cup that is out of alignment with the battery charger to rotate into a position in which the ear cup is aligned with the battery charger.

6. The headphone system of claim 1, wherein the hinge assembly is configured to maintain an alignment of the ear cups when the ear cup magnets are positioned proximate the corresponding battery charger magnets of the battery charger.

7. The headphone system of claim 6, wherein the hinge assembly includes a swivel pivot assembly configured for attachment with the headband assembly, the swivel pivot assembly configured to allow an ear cup to swivel within a swivel angle range.

8. The headphone system of claim 1, wherein the hinge assembly includes a swivel pivot assembly configured for attachment with the headband assembly, the swivel pivot assembly configured to allow an ear cup to swivel within a swivel angle range.

9. The headphone system of claim 8, wherein the swivel pivot assembly includes a spring.

10. The headphone system of claim 8, wherein the hinge assembly includes:
an arm; and
a camber pivot assembly configured to allow an ear cup to swivel within a camber angle range, wherein a first portion of the arm is attached to the camber pivot assembly and a second portion of the arm is attached to the swivel pivot assembly.

11. The headphone system of claim 1, wherein the ear cup enclosure comprises a single piece of flexible material that encloses the ear cup.

12. The headphone system of claim 1, wherein at least a portion of each ear pad assembly is within a corresponding ear cup enclosure when the ear cups are worn.

13. A headphone battery charger, comprising:
an electrical output mechanism configured for providing power to a headphone electrical input mechanism; and
at least four battery charger magnets, two of the battery charger magnets having a same polarity as headphone ear cup magnets and two of the battery charger magnets having a polarity that is opposite from the polarity of the headphone ear cup magnets, the at least four battery charger magnets being configured to align the headphone electrical input mechanism with the electrical output mechanism when the headphone ear cup magnets are positioned proximate the battery charger magnets having the polarity that is opposite from the polarity of the headphone ear cup magnets.

14. The headphone battery charger of claim 13, wherein the two battery charger magnets having the same polarity as the headphone ear cup magnets reside on opposing sides of one of the battery charger magnets having the polarity that is opposite from the polarity of the headphone ear cup magnets.

15. A headphone system, comprising:
two ear cups, each ear cup comprising:
an ear cup enclosure;
an ear pad assembly;
a hinge assembly disposed within the ear cup enclosure such that the hinge assembly is not visible from the exterior of the ear cup, wherein the hinge assembly of each ear cup is configured to pivot the ear cup around two axes; and
a speaker system including at least one speaker;
a headband assembly configured for connecting with each of the ear cups, via the hinge assembly;
an interface system, comprising:
at least one interface; and
a plurality of input source buttons disposed on at least one of the ear cups, each of the input source buttons configured for selecting a corresponding source of audio data received via the at least one interface; and
a control system configured for controlling the speaker system of each ear cup to reproduce the audio data received via the interface and selected by one of the input source buttons.

16. The headphone system of claim 15, wherein the hinge assembly of each ear cup is configured to return the ear cup to a rest position after the ear cup has been displaced from the rest position.

17. A headphone system, comprising:
two ear cups, each ear cup comprising:
an ear cup enclosure;
an ear pad assembly;
a hinge assembly disposed within the ear cup enclosure such that the hinge assembly is not visible from the exterior of the ear cup, wherein the hinge assembly of each ear cup is configured to return the ear cup to a rest position after the ear cup has been displaced from the rest position; and
a speaker system including at least one speaker;
a headband assembly configured for connecting with each of the ear cups, via the hinge assembly;
an interface system, comprising:
at least one interface; and
a plurality of input source buttons disposed on at least one of the ear cups, each of the input source buttons configured for selecting a corresponding source of audio data received via the at least one interface; and a control system configured for controlling the speaker system of each ear cup to reproduce the audio data received via the interface and selected by one of the input source buttons.

18. The headphone system of claim 17, wherein the hinge assembly of each ear cup is configured to pivot the ear cup around two axes.

19. A headphone system, comprising:

two ear cups, each ear cup comprising:
- an ear cup enclosure;
- an ear pad assembly, wherein the ear cup enclosure comprises a first portion of flexible material that encloses a support structure and overmold foam disposed on the support structure, and wherein a second portion of flexible material encloses ear pad foam of the ear pad assembly;
- a hinge assembly disposed within the ear cup enclosure such that the hinge assembly is not visible from the exterior of the ear cup; and
- a speaker system including at least one speaker;

a headband assembly configured for connecting with each of the ear cups, via the hinge assembly;

an interface system, comprising:
- at least one interface; and
- a plurality of input source buttons disposed on at least one of the ear cups, each of the input source buttons configured for selecting a corresponding source of audio data received via the at least one interface; and a control system configured for controlling the speaker system of each ear cup to reproduce the audio data received via the interface and selected by one of the input source buttons.

20. The headphone system of claim 19, wherein the ear pad assembly comprises an ear pad support structure proximate the ear pad foam.

21. The headphone system of claim 19, wherein the ear pad support structure defines an angle between the ear pad assembly and the ear cup enclosure.

22. The headphone system of claim 19, further comprising at least one of an adhesive layer or a fastener for joining the first portion and the second portion.

23. The headphone system of claim 19, wherein both the ear pad foam and the overmold foam are compressed when the ear cups are worn.

* * * * *